(12) United States Patent
Oh

(10) Patent No.: US 10,908,423 B2
(45) Date of Patent: Feb. 2, 2021

(54) MULTILAYER LIQUID CRYSTAL DIFFRACTIVE GRATINGS FOR REDIRECTING LIGHT OF WIDE INCIDENT ANGLE RANGES

(71) Applicant: MAGIC LEAP, INC., Plantation, FL (US)

(72) Inventor: Chulwoo Oh, Cedar Park, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/815,250

(22) Filed: Nov. 16, 2017

(65) Prior Publication Data

US 2018/0143438 A1 May 24, 2018

Related U.S. Application Data

(60) Provisional application No. 62/424,305, filed on Nov. 18, 2016.

(51) Int. Cl.
*G02B 27/01* (2006.01)
*G02B 1/02* (2006.01)
(Continued)

(52) U.S. Cl.
CPC .......... *G02B 27/0172* (2013.01); *G02B 1/02* (2013.01); *G02B 5/1842* (2013.01);
(Continued)

(58) Field of Classification Search
CPC .......................... G02B 6/0056; G02B 27/0172
See application file for complete search history.

(56) References Cited

U.S. PATENT DOCUMENTS 4,693,544 A 9/1987 Yamasaki et al.
4,991,924 A 2/1991 Shankar et al.
(Continued)

FOREIGN PATENT DOCUMENTS

CN 101133348 B 9/2010
CN 102683803 9/2012
(Continued)

OTHER PUBLICATIONS

International Search Report and Written Opinion for PCT Application No. PCT/US2017/062083, dated Mar. 19, 2018.
(Continued)

*Primary Examiner* — Michael H Caley
*Assistant Examiner* — Mariam Qureshi
(74) *Attorney, Agent, or Firm* — Knobbe, Martens, Olson & Bear, LLP

(57) ABSTRACT

An optical device includes a stack of multiple grating structures, each of which includes a plurality of sublayers of liquid crystal material. Each sublayer of liquid crystal material includes laterally extending repeating units, each formed of a plurality of liquid crystal molecules. The repeating units of the liquid crystal layers are lateral offset from one another, and defined a tilt angle. The grating structures forming the stack of grating structure have tilt angles of different magnitudes. The grating structures may be configured to redirect light of visible or infrared wavelengths. Advantageously, the different tilt angles of the stack of grating structures allows for highly efficient diffraction of light incident on the grating structures at a wide range of incident angles.

18 Claims, 17 Drawing Sheets

(51) Int. Cl.
*G02B 5/18* (2006.01)
*F21V 8/00* (2006.01)
*G02B 27/00* (2006.01)
*G02B 27/42* (2006.01)
*G02B 6/34* (2006.01)

(52) U.S. Cl.
CPC ......... *G02B 5/1857* (2013.01); *G02B 6/0016* (2013.01); *G02B 6/0035* (2013.01); *G02B 6/0056* (2013.01); *G02B 6/0076* (2013.01); *G02B 27/0081* (2013.01); *G02B 27/4261* (2013.01); *G02B 6/34* (2013.01); *G02B 2027/0125* (2013.01)

(56) References Cited

U.S. PATENT DOCUMENTS

| | | |
|---|---|---|
| 5,592,314 A | 1/1997 | Ogasawara et al. |
| 5,808,797 A | 9/1998 | Bloom et al. |
| 5,915,051 A | 6/1999 | Damask et al. |
| 6,181,393 B1 | 1/2001 | Enomoto et al. |
| 6,188,462 B1 | 2/2001 | Lavrentovich et al. |
| 6,334,960 B1 | 1/2002 | Willson et al. |
| 6,542,671 B1 | 4/2003 | Ma et al. |
| 6,680,767 B2 | 1/2004 | Coates et al. |
| 6,690,845 B1 | 2/2004 | Yoshimura et al. |
| 6,735,224 B2 | 5/2004 | Murry et al. |
| 6,750,941 B2 | 6/2004 | Satoh et al. |
| 6,850,221 B1 | 2/2005 | Tickle |
| 6,873,087 B1 | 3/2005 | Choi et al. |
| 6,900,881 B2 | 5/2005 | Sreenivasan et al. |
| 6,982,818 B2 | 1/2006 | Riza et al. |
| D514,570 S | 2/2006 | Ohta |
| 7,023,466 B2 | 4/2006 | Favalora et al. |
| 7,070,405 B2 | 7/2006 | Sreenivasan et al. |
| 7,098,572 B2 | 8/2006 | Choi et al. |
| 7,122,482 B2 | 10/2006 | Xu et al. |
| 7,140,861 B2 | 11/2006 | Watts et al. |
| 7,375,784 B2 | 5/2008 | Smith et al. |
| 7,519,096 B2 | 4/2009 | Bouma et al. |
| 7,573,640 B2 | 8/2009 | Nivon et al. |
| 7,692,759 B2 | 4/2010 | Escuti et al. |
| 7,705,943 B2 | 4/2010 | Kume et al. |
| 8,064,035 B2 | 11/2011 | Escuti et al. |
| 8,076,386 B2 | 12/2011 | Xu et al. |
| 8,233,204 B1 | 7/2012 | Robbins et al. |
| 8,248,458 B2 | 8/2012 | Schowengerdt et al. |
| 8,264,623 B2 | 9/2012 | Marrucci |
| 8,339,566 B2 | 12/2012 | Escuti et al. |
| 8,508,848 B2 | 8/2013 | Saarikko |
| 8,757,812 B2 | 6/2014 | Melville et al. |
| 8,885,997 B2 | 11/2014 | Nguyen et al. |
| 8,950,867 B2 | 2/2015 | Macnamara |
| 9,081,426 B2 | 7/2015 | Armstrong |
| 9,195,092 B2 | 11/2015 | Escuti et al. |
| 9,215,293 B2 | 12/2015 | Miller |
| D752,529 S | 3/2016 | Loretan et al. |
| 9,310,559 B2 | 4/2016 | Macnamara |
| 9,345,402 B2 | 5/2016 | Gao |
| 9,348,143 B2 | 5/2016 | Gao et al. |
| D758,367 S | 6/2016 | Natsume |
| D759,657 S | 7/2016 | Kujawski et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| D794,288 S | 8/2017 | Beers et al. |
| 9,740,006 B2 | 8/2017 | Gao |
| 9,791,700 B2 | 10/2017 | Schowengerdt et al. |
| D805,734 S | 12/2017 | Fisher et al. |
| 9,846,967 B2 | 12/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski et al. |
| 10,025,160 B2 | 7/2018 | Park et al. |
| 10,156,725 B2 | 12/2018 | TeKolste et al. |
| 10,254,454 B2 | 4/2019 | Klug et al. |
| 10,261,318 B2 | 4/2019 | TeKolste et al. |
| 10,466,561 B2 | 11/2019 | Oh |
| 2002/0097962 A1 | 7/2002 | Yoshimura et al. |
| 2002/0126249 A1 | 9/2002 | Liang et al. |
| 2002/0167638 A1 | 11/2002 | Byun et al. |
| 2002/0172237 A1 | 11/2002 | Murry et al. |
| 2003/0147112 A1 | 8/2003 | Mukawa |
| 2003/0161573 A1 | 8/2003 | Ishida |
| 2004/0007465 A1 | 1/2004 | Goldberg et al. |
| 2004/0022888 A1 | 2/2004 | Sreenivasan et al. |
| 2004/0120647 A1 | 6/2004 | Sakata et al. |
| 2004/0150141 A1 | 8/2004 | Chao et al. |
| 2004/0184163 A1 | 9/2004 | Nishioka et al. |
| 2004/0191429 A1 | 9/2004 | Patrick |
| 2005/0042391 A1 | 2/2005 | Ryan et al. |
| 2005/0072959 A1 | 4/2005 | Moia et al. |
| 2005/0140880 A1 | 6/2005 | Lee et al. |
| 2005/0232530 A1 | 10/2005 | Kekas |
| 2005/0253112 A1 | 11/2005 | Kelly et al. |
| 2005/0270312 A1 | 12/2005 | Lad et al. |
| 2005/0270461 A1 | 12/2005 | Kitson et al. |
| 2006/0017876 A1 | 1/2006 | Watts |
| 2006/0055858 A1 | 3/2006 | Nakanishi et al. |
| 2006/0121358 A1 | 6/2006 | Rich et al. |
| 2006/0126179 A1 | 6/2006 | Levola |
| 2006/0146251 A1 | 7/2006 | Choi |
| 2006/0157443 A1 | 7/2006 | Mei |
| 2006/0227283 A1 | 10/2006 | Ooi et al. |
| 2007/0031097 A1 | 2/2007 | Heikenfeld et al. |
| 2008/0043166 A1 | 2/2008 | Liu et al. |
| 2008/0043334 A1 | 2/2008 | Itzkovitch et al. |
| 2008/0169479 A1 | 7/2008 | Xu et al. |
| 2009/0002617 A1 | 1/2009 | Jones |
| 2009/0141216 A1 | 6/2009 | Marrucci |
| 2010/0142570 A1 | 6/2010 | Konttinen et al. |
| 2010/0207964 A1 | 8/2010 | Kimmel et al. |
| 2010/0225856 A1* | 9/2010 | Escuti ................ G02B 5/1833 349/96 |
| 2010/0225876 A1 | 9/2010 | Escuti et al. |
| 2010/0252960 A1 | 10/2010 | Iosad et al. |
| 2011/0024950 A1 | 2/2011 | Kruglick |
| 2011/0049761 A1 | 3/2011 | Mataki |
| 2011/0194058 A1 | 8/2011 | Amos et al. |
| 2011/0242461 A1 | 10/2011 | Escuti et al. |
| 2012/0021140 A1 | 1/2012 | Dijksman et al. |
| 2012/0123074 A1* | 5/2012 | Okada ................ C08F 20/30 526/268 |
| 2012/0127062 A1 | 5/2012 | Bar-Zeev et al. |
| 2012/0162549 A1 | 6/2012 | Gao et al. |
| 2012/0206485 A1 | 8/2012 | Osterhout et al. |
| 2012/0206812 A1 | 8/2012 | Saito et al. |
| 2012/0218301 A1 | 8/2012 | Miller |
| 2012/0242918 A1 | 9/2012 | Valyukh et al. |
| 2012/0327330 A1 | 12/2012 | Takahashi et al. |
| 2013/0051730 A1 | 2/2013 | Travers et al. |
| 2013/0082922 A1 | 4/2013 | Miller |
| 2013/0117377 A1 | 5/2013 | Miller |
| 2013/0125027 A1 | 5/2013 | Abovitz |
| 2013/0169909 A1 | 7/2013 | Srivastava et al. |
| 2013/0222384 A1 | 8/2013 | Futterer |
| 2013/0235440 A1 | 9/2013 | Takeda et al. |
| 2013/0242392 A1 | 9/2013 | Amirparviz et al. |
| 2013/0314765 A1 | 11/2013 | Padilla et al. |
| 2013/0314789 A1 | 11/2013 | Saarikko et al. |
| 2013/0322810 A1 | 12/2013 | Robbins |
| 2014/0055740 A1 | 2/2014 | Spaulding et al. |
| 2014/0064655 A1 | 3/2014 | Nguyen et al. |
| 2014/0071539 A1 | 3/2014 | Gao |
| 2014/0140653 A1 | 5/2014 | Brown et al. |
| 2014/0140654 A1 | 5/2014 | Brown et al. |
| 2014/0177023 A1 | 6/2014 | Gao et al. |
| 2014/0211322 A1 | 7/2014 | Bohn et al. |
| 2014/0218468 A1 | 8/2014 | Gao et al. |
| 2014/0232993 A1 | 8/2014 | Kim |
| 2014/0233879 A1 | 8/2014 | Gibson et al. |
| 2014/0267420 A1 | 9/2014 | Schowengerdt |
| 2014/0306866 A1 | 10/2014 | Miller et al. |

(56) References Cited

U.S. PATENT DOCUMENTS

| | | |
|---|---|---|
| 2015/0002528 A1 | 1/2015 | Bohn et al. |
| 2015/0015879 A1 | 1/2015 | Papadopoulos et al. |
| 2015/0016777 A1 | 1/2015 | Abovitz et al. |
| 2015/0062500 A1 | 3/2015 | Park et al. |
| 2015/0103306 A1 | 4/2015 | Kaji et al. |
| 2015/0146147 A1 | 5/2015 | Choi et al. |
| 2015/0168731 A1 | 6/2015 | Robbins |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0234205 A1 | 8/2015 | Schowengerdt |
| 2015/0235431 A1 | 8/2015 | Schowengerdt |
| 2015/0241705 A1 | 8/2015 | Abovitz et al. |
| 2015/0268415 A1 | 9/2015 | Schowengerdt et al. |
| 2015/0293409 A1 | 10/2015 | Usukura et al. |
| 2015/0301249 A1 | 10/2015 | Pau et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0033698 A1* | 2/2016 | Escuti .................. G02B 5/3016 349/186 |
| 2016/0033771 A1 | 2/2016 | Tremblay et al. |
| 2016/0041390 A1 | 2/2016 | Poon et al. |
| 2016/0077338 A1 | 3/2016 | Robbins et al. |
| 2016/0097930 A1 | 4/2016 | Robbins et al. |
| 2016/0116739 A1 | 4/2016 | TeKolste et al. |
| 2016/0116979 A1 | 4/2016 | Border |
| 2016/0131947 A1 | 5/2016 | Park et al. |
| 2016/0167422 A1 | 6/2016 | Brehm et al. |
| 2016/0170268 A1 | 6/2016 | Song et al. |
| 2016/0187554 A1 | 6/2016 | Lee et al. |
| 2016/0209648 A1 | 7/2016 | Haddick et al. |
| 2016/0270656 A1 | 9/2016 | Samec et al. |
| 2017/0007182 A1 | 1/2017 | Samec et al. |
| 2017/0010466 A1 | 1/2017 | Klug et al. |
| 2017/0010488 A1 | 1/2017 | Klug et al. |
| 2017/0082858 A1 | 3/2017 | Klug et al. |
| 2017/0131595 A1 | 5/2017 | Yim et al. |
| 2017/0322419 A1 | 11/2017 | TeKolste et al. |
| 2017/0373459 A1 | 12/2017 | Weng et al. |
| 2018/0046859 A1 | 2/2018 | Jarvenpaa |
| 2018/0113309 A1 | 4/2018 | Robbins et al. |
| 2018/0113310 A1 | 4/2018 | Rolland et al. |
| 2018/0143470 A1 | 5/2018 | Oh et al. |
| 2018/0143485 A1 | 5/2018 | Oh |
| 2018/0143509 A1 | 5/2018 | Oh |
| 2018/0164627 A1 | 6/2018 | Oh |
| 2018/0164645 A1 | 6/2018 | Oh |
| 2018/0239147 A1 | 8/2018 | Schowengerdt |
| 2018/0239177 A1 | 8/2018 | Oh |
| 2018/0275350 A1 | 9/2018 | Oh |
| 2018/0275409 A1 | 9/2018 | Gao |
| 2019/0121142 A1 | 4/2019 | Tekolste |
| 2019/0227211 A1 | 7/2019 | Klug et al. |
| 2019/0243141 A1 | 8/2019 | TeKolste |
| 2019/0243142 A1 | 8/2019 | Tekolste |
| 2020/0174304 A1 | 6/2020 | Oh |

FOREIGN PATENT DOCUMENTS

| | | |
|---|---|---|
| CN | 104145208 | 11/2014 |
| EP | 0 132 077 | 1/1985 |
| EP | 0 415 735 | 3/1991 |
| EP | 2 065 750 | 6/2009 |
| EP | 2 664 430 | 11/2013 |
| WO | WO 2006/064301 | 6/2006 |
| WO | WO 2006/092758 | 9/2006 |
| WO | WO 2008/130555 | 10/2008 |
| WO | WO 2008/130561 | 10/2008 |
| WO | WO 2010/067114 | 6/2010 |
| WO | WO 2013/054115 | 4/2013 |
| WO | WO 2014/016403 | 1/2014 |
| WO | WO 2014/036537 | 3/2014 |
| WO | WO 2014/091204 | 6/2014 |
| WO | WO 2014/172252 | 10/2014 |
| WO | WO 2015/081313 | 6/2015 |
| WO | WO 2016/054092 | 4/2016 |
| WO | WO 2016/113533 | 7/2016 |
| WO | WO 2016/205249 | 12/2016 |
| WO | WO 2016/205256 | 12/2016 |
| WO | WO 2018/094079 | 5/2018 |
| WO | WO 2018/094093 | 5/2018 |
| WO | WO 2018/094096 | 5/2018 |
| WO | WO 2018/106963 | 6/2018 |
| WO | WO 2018/112101 | 6/2018 |
| WO | WO 2018/156779 | 8/2018 |
| WO | WO 2018/156784 | 8/2018 |
| WO | WO 2018/175343 | 9/2018 |
| WO | WO 2018/175488 | 9/2018 |

OTHER PUBLICATIONS

Kim J. et al., "Wide-angle, nonmechanical beam steering using thin liquid crystal polarization gratings", In *Advanced Wavefront Control: Methods, Devices, and Applications VI* (Aug. 26, 2008) vol. 7093; in 12 pages.

Oh et al., "Polarization-Independent Modulation Using Standard Liquid Crystal Microdisplays and Polymer Polarization Gratings," NC State University; International Display Research Conference, vol. 28, pp. 298-301, 2008. in 6 pages.

Invitation to Pay Additional Fees for PCT Application No. PCT/US2017/062083, dated Jan. 19, 2018.

"Metamaterials". Duke University. Center for Metamaterials and Integrated Plasmonics. May 11, 2015 (Retrieved from the internet Aug. 12, 2016). URL: http://web.archives.org/web/20150511045547/http://metamaterials.duke.edu/research/metamaterials.

Aieta, F. et al. "Multiwavelength achromatic metasurfaces by dispersive phase compensation." Science 347, 1342-1345 (2015).

Arbabi, A. et al. "Dielectric metasurfaces for complete control of phase and polarization with subwavelength spatial resolution and high transmission." Nature Nanotechnology.

Chigrinov, V,: Photoaligning and Photopatterning Technology: Applications in Displays and Photonics, Proceedings of SPIE, Emerging Liquid Crystal Technologies I, vol. 9769, Mar. 7, 2016, in 11 pages.

Crawford, et al.: "Liquid-crystal diffraction gratings using polarization holography alighnment techniques," Journal of Applied Physics 98, 123102, 2005.

Cunningham et al. "A plastic colorimetric resonant optical biosensor for multiparallel detection oflabel-free biochemical interactions", Sensors and Actuators, B, 85, 219-226 (2002).

Dierking, I.: "Chiral Liquid Crystals: Structures, Phases, Effects," Symmetry, (Jun. 2014) 6(2): 444-472.

Escuti J., "Polarization-Independent Modulation & Simplified Spectropolarimetry Using LC Polarization Gratings," paper #39.4, posters P-209, P-167, SID Symposium Digest, 2006.

Escuti M.J. et al., "Polarization-Independent Switching With High Contrast From a Liquid Crystal Polarization Grating," SID Symposium Digest (Jun. 2006) 37:1443-1446.

Escuti M.J. et al., NC State University Slides, "Polarization-Independent LC Microdisplays Using Liquid Crystal Polarization Gratings: A Viable Solution", Presentation at ILCC Jul. 1, 2008 in 15 pages.

International Preliminary Report on Patentability for PCT Application No. PCT/US2017/062083, dated May 3, 2019.

Kim, J. et al., "Wide-angle, nonmechanical beam steering with high throughput utilizing polarization gratings", Applied Optics (Jun. 2011) 50(17):2636-2639.

Komanduri R.K. et al., "34.4 L-Late-News Paper: Polarization Independent Projection Systems using Thin Film Polymer Polarization Gratings and Standard Liquid Crystal Microdisplays", In SID Symposium Digest of Technical Papers (Jun. 2009) in 4 pages.

(56) References Cited

OTHER PUBLICATIONS

Komanduri R.K. et al., "Elastic Continuum Analysis of the Liquid Crystal Polarization Grating", Physical Review E. (May 25, 2007) in 8 pages.

Komanduri R.K. et al., "Polarization-independent modulation for projection displays using small-period LC polarization gratings", J Soc Inform Display (2007) 15(8):589-594.

Komanduri R.K. et al., NC State University Slides, "Polarization Independent Projection Systems using Thin Film Polymer Polarization Gratings and Standard Liquid Crystal Microdisplays", Presentation at SID-Display Week (Jun. 3, 2009) in 12 pages.

Komanduri R.K.et al., "Late-News Paper: Polarization Independent Liquid Crystal Microdisplays", SID Symposium Digest of Tech Papers (May 2008) 39(1):236-239.

Komanduri, et al., "Multi-twist retarders: broadband retaration control using self-aligning reactive liquid crystal layers," Optical Society of America, Optics Express 404, vol. 21, No. 1, Jan. 14, 2013.

Kurioz, Y. et al.: "P-128: Orientation of a Reactive Mesogen on Photosensitive Surface," Society for Information Display (SID) Symposium Digest of Technical Papers, May 2007, in 3 pages.

Lee, et al., Negative dispersion of birefringence in two-dimensionally self-organized smectic liquid crystal and monomer thin film, Optics Letters, vol. 39, No. 17, Sep. 1, 2014.

Lim et al., "Anisotropic Nano-Imprinting Technique for Fabricating a Patterned Optical Film of a Liquid Cyrstalline Polymer", J Nanosci Nanotechnol. (2008) 8:4775-4778.

Lin, R. et al. Molecular-Scale soft imprint lithography for alignment layers in liquid crystal devices; Nano Letters, vol. 7, No. 6; Publication [online], May 23, 2007 [retrieved Feb. 7, 2018]. Retrieved from the Internet: URL:https://pubs.acs.org/doi/abs/10.1021/nl070559y; pp. 1613-1621.

Lin,D. et al. "Dielectric gradient metasurface optical elements." Science 345, 298-302 (2014).

Lub J. et al.: "Formation of Optical Films by Photo-Polymerisation of Liquid Crystalline Acrylates and Application of These Films in Liquid Crystal Display Technology," Mol Cryst Liq Cryst., (May 2005) 429(1):77-99.

Nikolova et al., "Diffraction Efficiency and Selectivity of Polarization Holographic Recording", Optica Acta: Int'l J Optics (1984) 31(5):579-588.

Oh C. et al., NC State University Slides, "Polarization-Independent Modulation", (2008) in 6 pages.

Oh C. et al.: "Achromatic Diffraction from Polarization Gratings with High Efficiency", Opt Lett. (Oct. 2008) 33(20):2287-2289 & Erratum Opt Lett. (Dec. 2009) 34(23):3637.

Oh C., Thesis: "Broadband Polarization Gratings for Efficient Liquid Crystal Display, Beam Steering, Spectropolarimetry, and Fresnel Zone Plate", N. C. State University, Electrical Engineering (2009) in 190 pages.

Oh et al., "Numerical analysis of polarization gratings using the finite-difference time-domain method", Physical Review A (Oct. 2007) 76:043815-1 to -8.

Oh et al., "Polarization-Independent Modulation Using Standard Liquid Crystal Microdisplays and Polymer Polarization Gratings," NC State University; International Display Research Conference, vol. 28, pp. 298-301, 2008. in 16 pages.

Wikipedia Blind spot (vision), URL: https://en.wikipedia.org/wiki/Blind_spot(vision) printed Apr. 16, 2019 in 1 page.

Yang et al. Negative dispersion of birefringence of smectic liquid crystal-polymer compostie: dependence on the constituent molecules and temperature, Optical Society of America, Optics Express 2466, vol. 23, No. 3, Feb. 9, 2015.

Yu, N. et al. "Light propagation with phase discontinuities: generalized laws of reflection and refraction." Science 334, 333-337 (2011).

Yu, N. et al., "Flat optics with designer metasurfaces", Review Article; Nature Materials, (Feb. 2014) 13: 139-150.

Invitation to Pay Additional Fees and, Where Applicable, Protest Fee for PCT Application No. PCT/US18/19250, dated May 2, 2018.

International Search Report and Written Opinion for PCT Application No. PCT/US18/19250, dated Jun. 29, 2018.

Invitation to Pay Additional Fees and, Where Applicable, Protest Fee for PCT Application No. PCT/US18/19257, dated May 3, 2018.

International Search Report and Written Opinion for PCT Application No. PCT/US18/19257, dated Jul. 2, 2018.

International Search Report and Written Opinion for PCT Application No. PCT/US2017/062063, dated Jan. 25, 2018.

Invitation to Pay Additional Fees and, Where Applicable, Protest Fee for PCT Application No. PC7./US2017/65182, mailed Feb. 14, 2018.

International Search Report and Written Opinion for PCT Application No. PCT/US2017/65182, dated Apr. 6, 2018.

International Preliminary Report on Patentability for PCT Application No. PCT/US2017/65182, dated Jun. 11, 2019.

International Search Report and Written Opinion for PCT Application No. PCT/US2018/023425, dated Jun. 22, 2018.

U.S. Appl. No. 16/904,013, Multilayer Liquid Crystal Diffractive Gratings for Redirecting Light of wide Incident Angle Ranges, filed Jun. 17, 2020.

U.S. Appl. No. 15/835,108, Diffractive Devices Based of Cholesteric Liquid Crystal, filed Dec. 7, 2017.

U.S. Appl. No. 16/673,652, Diffractive Devices Based on Cholesteric Liquid Crystal, filed Nov. 4, 2019.

\* cited by examiner

MULTILAYER LIQUID CRYSTAL DIFFRACTIVE GRATINGS FOR REDIRECTING LIGHT OF WIDE INCIDENT ANGLE RANGES

PRIORITY CLAIM

This application claims the priority benefit of U.S. Provisional Patent Application No. 62/424,305 filed on Nov. 18, 2016, which is incorporated by reference herein in its entirety.

INCORPORATION BY REFERENCE

This application incorporates by reference the entirety of each of the following patent applications: U.S. application Ser. No. 14/555,585 filed on Nov. 27, 2014; U.S. application Ser. No. 14/690,401 filed on Apr. 18, 2015; U.S. application Ser. No. 14/212,961 filed on Mar. 14, 2014; and U.S. application Ser. No. 14/331,218 filed on Jul. 14, 2014.

BACKGROUND

Field

The present disclosure relates to optical devices, including virtual reality and augmented reality imaging and visualization systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

The systems, methods and devices of the disclosure each have several innovative aspects, no single one of which is solely responsible for the desirable attributes disclosed herein.

An innovative aspect of the subject matter of this application includes an optical device comprising a first polarization grating structure and a second polarization grating structure over the first polarization grating structure. The first polarization grating structure comprises a first plurality of liquid crystal sublayers comprising liquid crystal molecules. The liquid crystal molecules form repeating units having a first periodicity along a lateral axis. The repeating units are laterally shifted by a first shift distance in comparison to similar repeating units of an immediately adjacent one of the first plurality of sublayers. The repeating units shifted by the first shift distance define a first tilt angle with respect to a normal to the lateral axis, the normal extending along a thickness axis of the first polarization grating structure. The second polarization grating structure comprises a second plurality of liquid crystal sublayers comprising liquid crystal molecules, wherein the liquid crystal molecules form repeating units having a second periodicity along the lateral axis. The repeating units are laterally shifted by a second shift distance in comparison to similar repeating units of an immediately adjacent one of the plurality of sublayers. The repeating units shifted by the second shift distance define a second tilt angle with respect to the normal to the lateral axis. The magnitudes of the first and second tilt angles are different.

In various embodiments of the optical device, the liquid crystal molecules in each of the plurality of sublayers of the first polarization grating structure can be twisted by a first twist angle. The orientations of the liquid crystal molecules, as seen in a side or top-down view, can vary in a repeating pattern laterally across each of the sublayers. Each of the repeating units in the plurality of liquid crystal sublayers of the first polarization grating structure can be formed by a plurality of liquid crystal molecules having a similar progression of orientations.

In various embodiments of the optical device, the repeating units of successively higher levels of the liquid crystal sublayers of the first and second polarization grating structures can be shifted in a same direction. In various embodiments, the liquid crystal molecules in each of the plurality of sublayers of the second polarization grating structure can be twisted by a second twist angle. The liquid crystal molecules, as seen in a side or top-down view, can vary in a repeating pattern laterally across each of the sublayers. Each of the repeating units in the plurality of liquid crystal sublayers of the second polarization grating structure can be formed by a plurality of liquid crystal molecules having a similar progression of orientations. The liquid crystal molecules in the plurality of sublayers can be part of a polymerized liquid crystal material. For example, the liquid crystal molecules in the plurality of sublayers can comprise liquid crystalline di-acrylate. In various embodiments, the plurality of sublayers can be doped with chiral dopants. The liquid crystal molecules can have a tilt angle ($\theta 1$) between about $-85$ degrees and 85 degrees. In various embodiments, the liquid crystal molecules can be configured to diffract at least 40% of a beam of light incident on the polarization grating structure at an incident angle ($\theta_{inc}$) between about $-20$ degrees and 20 degrees relative to the tilt angle.

Various embodiments of the optical device can further comprise a third polarization grating structure over the second polarization grating structure, the third polarization grating structure can include a plurality of liquid crystal sublayers comprising liquid crystal molecules that form repeating units having a third periodicity. The repeating units can be laterally shifted by a third shift distance in comparison to similar repeating units of an immediately adjacent one of the plurality of sublayers. The repeating units can be shifted by the third shift distance define a third tilt angle with respect to the normal to the lateral axis. The magnitudes of the first, second, and third tilt angles can be different.

The liquid crystal sublayers of each of the first, second, and third polarization grating structures can have different compositions than others of the first, second, and third polarization grating structures. The first and second polarization grating structures can be over a waveguide and further comprise a template layer over the waveguide and under the first and second polarization grating structures. In various embodiments, the first, second and third polarization grating structures can be in-coupling optical elements that configured to in-couple an incident beam of light into the waveguide such that the incident beam of light propagates through the waveguide by total internal reflection. The first, second and third polarization grating structures can be out-coupling optical elements configured to out-couple an incident beam of light propagating through the waveguide by total internal reflection. The first, second and third polarization grating structures can be orthogonal pupil expanders configured to redirect light propagating through the waveguide by total internal reflection, wherein the redirected light continues to propagate through the waveguide by total internal reflection.

Various embodiments of the optical device can comprise a light modulation device configured to direct light into the waveguide via the first and second polarization grating structures. Various embodiments of the optical device can further comprise a stack of waveguides, each waveguide comprising first and second polarization grating structures comprising pluralities of liquid crystal sublayers having tilt angles of different magnitudes.

Another innovative aspect of the subject matter of this application is embodied in an optical device comprising a first polarization grating structure having a first thickness and a second polarization grating structure over the first polarization grating structure. The first polarization grating structure comprises a first plurality of liquid crystal sublayers comprising liquid crystal molecules and chiral dopants. The second polarization grating structure has a second thickness and comprises a second plurality of liquid crystal sublayers comprising liquid crystal molecules and chiral dopants. At least one of the thicknesses of the first and second polarization grating structures, concentrations of chiral dopants in the first and second polarization grating structures or chiral dopants of the first and second polarization grating structures can be different between the first and second polarization grating structures. The different chiral dopants of the first and second polarization grating structures can have a same handedness.

In various embodiments of the optical device, the liquid crystal molecules can comprise chiral nematic liquid crystal molecules. The chiral dopant concentrations of the first and second polarization grating structures can differ by about 0.1 wt-% or more. The thicknesses of the first and second polarization grating structures can differ by an amount less than about 10 µm.

Another innovative aspect of the subject matter of this application includes a method for fabricating an optical device, the method comprising: providing an alignment layer over a substrate; patterning the alignment layer; depositing a first liquid crystal layer on the alignment layer; aligning liquid crystal molecules of the first liquid crystal layer with the alignment layer, thereby forming a first plurality of levels of repeating liquid crystal molecules defining a first tilt angle; depositing a second liquid crystal layer on the first liquid crystal layers; aligning liquid crystal molecules of the second liquid crystal layer with the liquid crystal molecules of an immediately underlying first liquid crystal layer, thereby forming a second plurality of levels of repeating liquid crystal molecules defining a second tilt angle; wherein magnitudes of the first and second tilt angles differ.

In various embodiments of the method, patterning the alignment layer can comprise defining a pattern of grooves in the alignment layer. Defining the pattern of grooves in the alignment layer can comprise nano-imprinting. Patterning the alignment layer can comprise recording an interference pattern in the alignment layer. Various embodiments of the method can comprise depositing an additional alignment layer over the first liquid crystal layer; and patterning the additional alignment layer.

Yet another innovative aspect of the subject matter of this application is embodied in a display system comprising: an optically transmissive waveguide and a diffractive optical element forming an in-coupling optical element, an exit pupil expander, or an orthogonal pupil expander on a surface of the waveguide. The diffractive optical element comprises a plurality of liquid crystal sublayers comprising liquid crystal molecules. The liquid crystal molecules can form repeating units having a periodicity along a lateral axis. The repeating units is laterally shifted by a shift distance in comparison to similar repeating units of an immediately adjacent one of the plurality of sublayers. The shift distance defines a tilt angle with respect to a normal to the lateral axis, the normal extending along a thickness axis of the first polarization grating structure.

In various embodiments of the display system, the waveguide can be a part of a stack of waveguides. Each waveguide in the stack can have an associated diffractive optical element comprising a plurality of liquid crystal sublayers comprising liquid crystal molecules. The liquid crystal molecules can form repeating units having a periodicity. The repeating units can be laterally shifted by a shift distance in comparison to similar repeating units of an immediately adjacent one of the plurality of sublayers. The shift distance can define a tilt angle with respect to the normal to the lateral axis.

Another innovative aspect of the subject matter of this application includes a method for fabricating an optical device, the method comprising: providing a first liquid crystal layer in contact with a substrate and a first imprint template including a plurality of surface features arranged in a first pattern; and aligning molecules of the first liquid crystal layer to the surface features thereby forming a first plurality of levels of repeating liquid crystal molecules defining a first tilt angle.

Various embodiments of the method can comprise polymerizing the molecules of the first liquid crystal layer; removing the first imprint template; depositing a second liquid crystal layer in contact with the first liquid crystal layer; and aligning molecules of the second liquid crystal layer to molecules of the first liquid crystal layer.

In various embodiments, at least one of the following thicknesses of the first and second liquid crystal layers; concentrations of chiral dopants in the first and second liquid crystal layers; or chiral dopants of the first and second liquid crystal layers can be different between the first and second liquid crystal layers. The different chiral dopants of the first and second liquid crystal layers can have a same handedness.

In various embodiments of the method, providing a first liquid crystal layer in contact with a substrate and a first imprint template comprises depositing the first liquid crystal layer on the substrate; and contacting the first liquid crystal layer with the first imprint template.

Various embodiments of the method can further comprise polymerizing the molecules of the first liquid crystal layer; removing the first imprint template; depositing a second liquid crystal layer in contact with the first liquid crystal layer; contacting the second liquid crystal layer with a second imprint template; and aligning molecules of the second liquid crystal layer to a pattern of surface features in the second imprint template.

Various embodiments of the method can further comprise polymerizing the molecules of the first liquid crystal layer; removing the first imprint template; forming a planarization layer over the first liquid crystal layer; depositing a second liquid crystal layer over the planarization layer; contacting the second liquid crystal layer with a second imprint template; and aligning molecules of the second liquid crystal layer to a pattern of surface features in the second imprint template.

Various examples of optical devices comprising grating structures and their methods of manufacturing are described herein such as the examples enumerated below:

Example 1

An optical device comprising:
a first polarization grating structure comprising:
a first plurality of liquid crystal sublayers comprising liquid crystal molecules, wherein the liquid crystal molecules form repeating units having a first periodicity along a lateral axis, and
wherein the repeating units are laterally shifted by a first shift distance in comparison to similar repeating units of an immediately adjacent one of the first plurality of sublayers, wherein the repeating units shifted by the first shift distance define a first tilt angle with respect to a normal to the lateral axis, the normal extending along a thickness axis of the first polarization grating structure; and
a second polarization grating structure over the first polarization grating structure, the second polarization grating structure comprising:
a second plurality of liquid crystal sublayers comprising liquid crystal molecules, wherein the liquid crystal molecules form repeating units having a second periodicity along the lateral axis, and
wherein the repeating units are laterally shifted by a second shift distance in comparison to similar repeating units of an immediately adjacent one of the plurality of sublayers, wherein the repeating units shifted by the second shift distance define a second tilt angle with respect to the normal to the lateral axis,
wherein magnitudes of the first and second tilt angles are different.

Example 2

The device of Example 1, wherein liquid crystal molecules in each of the plurality of sublayers of the first polarization grating structure are twisted by a first twist angle,
wherein orientations of the liquid crystal molecules, as seen in a side or top-down view, vary in a repeating pattern laterally across each of the sublayers, and
wherein each of the repeating units in the plurality of liquid crystal sublayers of the first polarization grating structure are formed by a plurality of liquid crystal molecules having a similar progression of orientations.

Example 3

The device of any of Examples 1-2, wherein the repeating units of successively higher levels of the liquid crystal sublayers of the first and second polarization grating structures are shifted in a same direction.

Example 4

The device of any of Examples 1-3, wherein liquid crystal molecules in each of the plurality of sublayers of the second polarization grating structure are twisted by a second twist angle,
wherein orientations of the liquid crystal molecules, as seen in a side or top-down view, vary in a repeating pattern laterally across each of the sublayers,
wherein each of the repeating units in the plurality of liquid crystal sublayers of the second polarization grating structure are formed by a plurality of liquid crystal molecules having a similar progression of orientations.

Example 5

The device of any of Examples 1-4, wherein the liquid crystal molecules in the plurality of sublayers are part of a polymerized liquid crystal material.

Example 6

The device of any of Examples 1-5, wherein the liquid crystal molecules in the plurality of sublayers comprise liquid crystalline di-acrylate.

Example 7

The device of any of Examples 1-6, wherein the plurality of sublayers are doped with chiral dopants.

Example 8

The device of any of Examples 1-7, wherein the liquid crystal molecules have a tilt angle ($\theta 1$) between about −85 degrees and 85 degrees.

Example 9

The device of any of Examples 1-8, wherein the liquid crystal molecules are configured to diffract at least 40% of a beam of light incident on the polarization grating structure at an incident angle ($\theta inc$) between about −20 degrees and 20 degrees relative to the tilt angle.

Example 10

The device of any of Examples 1-9, further comprising a third polarization grating structure over the second polarization grating structure, the third polarization grating structure including a plurality of liquid crystal sublayers comprising liquid crystal molecules, wherein the liquid crystal molecules form repeating units having a third periodicity, wherein the repeating units are laterally shifted by a third shift distance in comparison to similar repeating units of an immediately adjacent one of the plurality of sublayers, wherein the repeating units shifted by the third shift distance define a third tilt angle with respect to the normal to the lateral axis, wherein magnitudes of the first, second, and third tilt angles are different.

Example 11

The device of Example 10, wherein the liquid crystal sublayers of each of the first, second, and third polarization grating structures have different compositions than others of the first, second, and third polarization grating structures.

Example 12

The device of any of Examples 1-11, wherein the first and second polarization grating structures are over a waveguide and further comprising:

a template layer over the waveguide and under the first and second polarization grating structures.

Example 13

The device of Example 12, wherein the first and second polarization grating structures are in-coupling optical elements configured to in-couple an incident beam of light into the waveguide such that the incident beam of light propagates through the waveguide by total internal reflection.

Example 14

The device of Example 13, further comprising a light modulation device configured to direct light into the waveguide via the first and second polarization grating structures.

Example 15

The device of any of Examples 13-14, wherein the first and second polarization grating structures are out-coupling optical elements configured to out-couple an incident beam of light propagating through the waveguide by total internal reflection.

Example 16

The device of any of Examples 13-15, wherein the first and second polarization grating structures are orthogonal pupil expanders configured to redirect light propagating through the waveguide by total internal reflection, wherein the redirected light continues to propagate through the waveguide by total internal reflection.

Example 17

The device of any of Examples 13-16, further comprising a stack of waveguides, each waveguide comprising first and second polarization grating structures comprising pluralities of liquid crystal sublayers having tilt angles of different magnitudes.

Example 18

An optical device comprising:

a first polarization grating structure having a first thickness, the first polarization grating structure comprising:

a first plurality of liquid crystal sublayers comprising liquid crystal molecules and chiral dopants; and a second polarization grating structure over the first polarization grating structure, the second polarization grating structure having second thickness and comprising:

a second plurality of liquid crystal sublayers comprising liquid crystal molecules and chiral dopants, wherein at least one of the following are different between the first and second polarization grating structures:

thicknesses of the first and second polarization grating structures;

concentrations of chiral dopants in the first and second polarization grating structures; or chiral dopants of the first and second polarization grating structures, wherein the different chiral dopants of the first and second polarization grating structures have a same handedness.

Example 19

The device of Example 18, wherein the liquid crystal molecules are chiral nematic liquid crystal molecules.

Example 20

The device of any of Examples 18-19, wherein the chiral dopant concentrations of the first and second polarization grating structures differ by about 0.1 wt-% or more.

Example 21

The device of any of Examples 18-20, wherein thicknesses of the first and second polarization grating structures differ by an amount less than about 10 μm.

Example 22

A method for fabricating an optical device, the method comprising:

providing an alignment layer over a substrate;

patterning the alignment layer;

depositing a first liquid crystal layer on the alignment layer;

aligning liquid crystal molecules of the first liquid crystal layer with the alignment layer, thereby forming a first plurality of levels of repeating liquid crystal molecules defining a first tilt angle;

depositing a second liquid crystal layer on the first liquid crystal layers;

aligning liquid crystal molecules of the second liquid crystal layer with the liquid crystal molecules of an immediately underlying first liquid crystal layer, thereby forming a second plurality of levels of repeating liquid crystal molecules defining a second tilt angle;

wherein magnitudes of the first and second tilt angles differ.

Example 23

The method of Example 22, wherein patterning the alignment layer comprises defining a pattern of grooves in the alignment layer.

Example 24

The method of Example 23, wherein defining the pattern of grooves in the alignment layer comprises nano-imprinting.

Example 25

The method of any of Examples 22-24, wherein patterning the alignment layer comprises recording an interference pattern in the alignment layer.

Example 26

The method of any of Examples 22-25, further comprising:
depositing an additional alignment layer over the first liquid crystal layer; and
patterning the additional alignment layer.

Example 27

A display system comprising:
an optically transmissive waveguide;
a diffractive optical element forming an in-coupling optical element, an exit pupil expander, or an orthogonal pupil expander on a surface of the waveguide, the diffractive optical element comprising:
a plurality of liquid crystal sublayers comprising liquid crystal molecules,
wherein the liquid crystal molecules form repeating units having a periodicity along a lateral axis,
wherein the repeating units are laterally shifted by a shift distance in comparison to similar repeating units of an immediately adjacent one of the plurality of sublayers, wherein the shift distance defines a tilt angle with respect to a normal to the lateral axis, the normal extending along a thickness axis of the first polarization grating structure.

Example 28

The system of Example 27, wherein waveguide is part of a stack of waveguides, wherein each of the waveguides has an associated diffractive optical element comprising:
a plurality of liquid crystal sublayers comprising liquid crystal molecules,
wherein the liquid crystal molecules form repeating units having a periodicity,
wherein the repeating units are laterally shifted by a shift distance in comparison to similar repeating units of an immediately adjacent one of the plurality of sublayers, wherein the shift distance defines a tilt angle with respect to the normal to the lateral axis.

Example 29

A method for fabricating an optical device, the method comprising:
providing a first liquid crystal layer in contact with a substrate and a first imprint template including a plurality of surface features arranged in a first pattern; and
aligning molecules of the first liquid crystal layer to the surface features thereby forming a first plurality of levels of repeating liquid crystal molecules defining a first tilt angle.

Example 30

The method of Example 29, further comprising:
polymerizing the molecules of the first liquid crystal layer;
removing the first imprint template;
depositing a second liquid crystal layer in contact with the first liquid crystal layer; and
aligning molecules of the second liquid crystal layer to molecules of the first liquid crystal layer.

Example 31

The method of Example 30, wherein at least one of the following are different between the first and second liquid crystal layers:
thicknesses of the first and second liquid crystal layers;
concentrations of chiral dopants in the first and second liquid crystal layers; or
chiral dopants of the first and second liquid crystal layers, wherein the different chiral dopants of the first and second liquid crystal layers have a same handedness.

Example 32

The method of any of Examples 29-31, wherein providing a first liquid crystal layer in contact with a substrate and a first imprint template comprises:
depositing the first liquid crystal layer on the substrate; and
contacting the first liquid crystal layer with the first imprint template.

Example 33

The method of any of Examples 29-32, further comprising:
polymerizing the molecules of the first liquid crystal layer;
removing the first imprint template;
depositing a second liquid crystal layer in contact with the first liquid crystal layer;
contacting the second liquid crystal layer with a second imprint template; and
aligning molecules of the second liquid crystal layer to a pattern of surface features in the second imprint template.

Example 34

The method of any of Examples 29-33, further comprising:
polymerizing the molecules of the first liquid crystal layer;
removing the first imprint template;
forming a planarization layer over the first liquid crystal layer;
depositing a second liquid crystal layer over the planarization layer;
contacting the second liquid crystal layer with a second imprint template; and
aligning molecules of the second liquid crystal layer to a pattern of surface features in the second imprint template.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 12A and 12B-1 illustrate examples of stacks of grating structures.

FIG. 12B-2 is an example of plot of the tilt angles and thicknesses of the stack illustrated in FIG. 12B-1.

FIG. 12C-1 illustrates an example of a single liquid crystal polarization grating structure having one tilt angle. FIG. 12C-2 illustrates examples of the first order diffraction efficiency, for light of different incident angles, of the single liquid crystal polarization grating structure having one tilt angle depicted in FIG. 12C-1.

FIG. 12D-1 illustrates an example of a stack of two liquid crystal polarization grating structures, each having a tilt angle of a different magnitude. FIG. 12D-2 illustrates examples of the first order diffraction efficiency, for light of different incident angles, of the stack of two liquid crystal polarization grating structures, each having a tilt angle of a different magnitude depicted in FIG. 12D-1.

Like reference numbers and designations in the various drawings indicate like elements.

DETAILED DESCRIPTION

Figure 1:
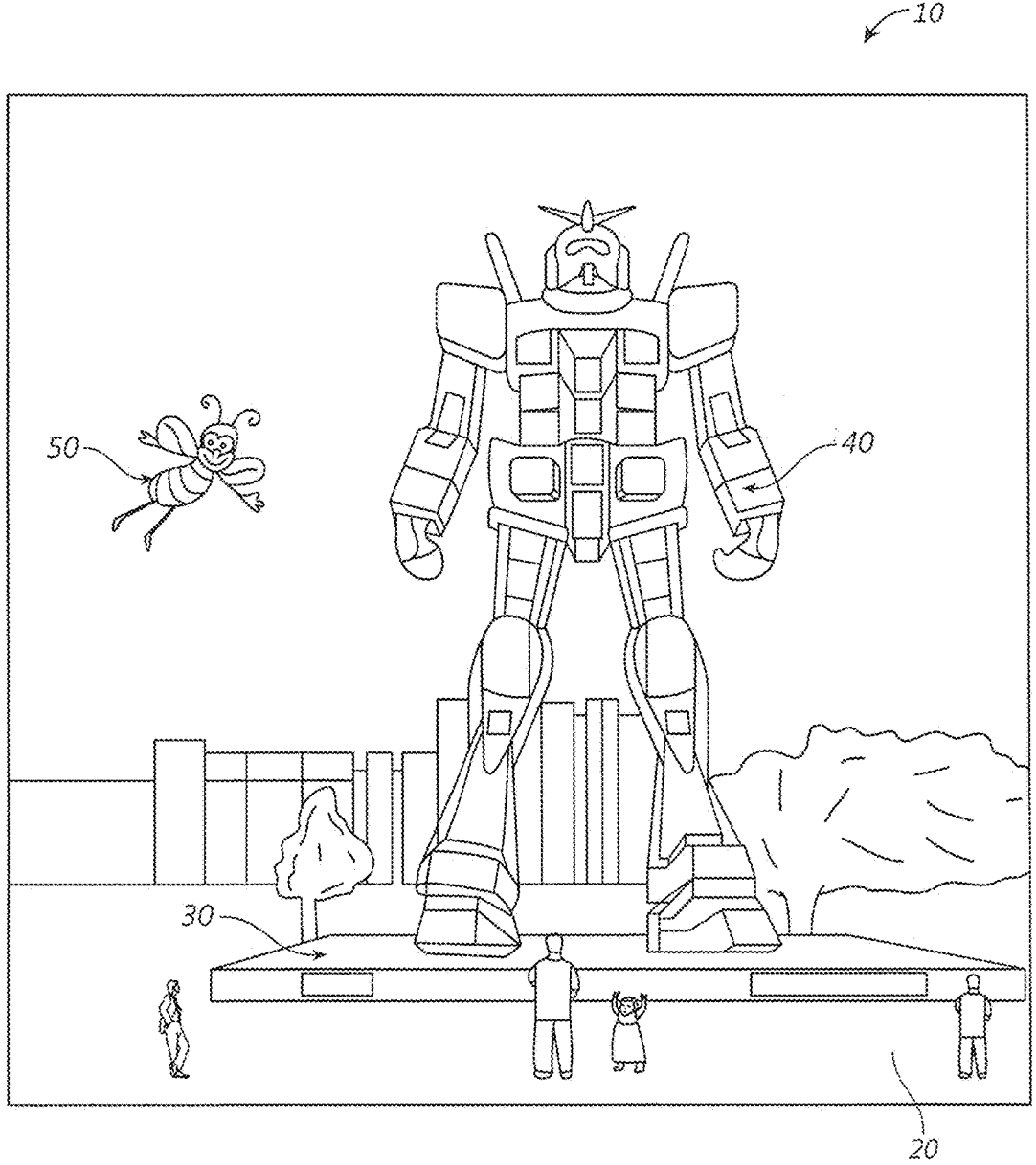
FIG. 1 illustrates a user's view of augmented reality (AR) through an AR device.

In some embodiments, diffractive optical elements such as polarization gratings include liquid crystal grating structures (e.g., liquid crystal polarization gratings) that are configured to diffract light at high efficiencies (e.g., diffraction efficiencies greater than or equal to about 40%) for a wide range of incident angles. The liquid crystal grating structure comprises a plurality of sublayers of liquid crystal material comprising liquid crystal molecules. The orientations of the liquid crystal molecules vary at regular intervals along a lateral axis across a sublayer, thereby forming repeating units of spaced-apart elongated liquid crystal molecules along the lateral axis. The repeating liquid crystal units are laterally offset relative to similar repeating units in an immediately adjacent sublayer of liquid crystal material, such that the offset repeating units of different sublayers (e.g. immediately neighboring sublayers) define a tilt angle ($\theta$) with respect to a normal to the lateral axis, with the normal extending parallel to the thickness dimension of the liquid crystal grating structure. Multiple liquid crystal grating structures, each formed by a plurality of sublayers of liquid crystal material, may form a stack of liquid crystal grating structures. The tilt angle of the sublayers forming each liquid crystal grating structure may have a different magnitude than the tilt angle of the sublayers forming a neighboring liquid crystal grating structure of the stack. In some embodiments, the liquid crystal grating structures may have different compositions and/or thicknesses from one another. For example, different liquid crystal grating structures may have different concentrations and/or types of chiral dopants. In some embodiments, at least some of the liquid crystal grating structures may include different liquid crystal material than other liquid crystal grating structures, and the material for each structure may be selected to facilitate providing a desired tilt angle.

In some embodiments, the liquid crystal material of each sublayer includes liquid crystal molecules that are rotated relative to liquid crystal molecules in other sublayers of the grating structure by a twist angle ($\Phi$). In some embodiments, the twist angle is the relative azimuthal angular rotation between a liquid crystal molecule on an uppermost sublayer and an underlying (e.g., directly underlying) liquid crystal molecule on a lowermost sublayer of the plurality of sublayers. In some embodiments, the twist angles of the liquid crystal molecules in different ones of the liquid crystal grating structures may be different, causing different tilt angles for the different grating structures. For a given type of liquid crystal molecules, it will be appreciated that the twist angle may be varied based upon chiral dopants present in the sublayers, and the thickness of the liquid crystal material forming the liquid crystal grating structure (e.g., the aggregate thickness of the sublayers forming a particular liquid crystal grating structure). Consequently, the different twist angle magnitudes for different liquid crystal grating structures may be achieved using different compositions and/or different thicknesses for the liquid crystal material forming each of the liquid crystal grating structures, as discussed herein.

In some embodiments, an alignment layer may be used to set the orientations of the liquid crystal molecules. The alignment layer may be deposited on a substrate and subsequently patterned. A first layer of liquid crystal molecules may then be deposited on the alignment layer and the liquid crystal molecules may be allowed to align with the underlying pattern of the alignment layer. In some embodiments, the alignment may result in the formation of multiple sublayers of liquid crystal molecules having a particular tilt angle, as discussed herein. The liquid crystal molecules may then be fixed in place. In some embodiments, the liquid crystal molecules may be polymerizable, e.g., by exposure to an energy source such as UV light where the liquid crystal molecule includes a photo-activated cross-linking chemical species. A second liquid crystal layer may then be deposited, and the liquid crystal molecules of that layer may be allowed to align with the underlying liquid crystal layer, and then fixed in place. In some embodiments, additional crystal layers may be deposited, and their constituent liquid crystal molecules may be allowed to self-align and then fixed in place. As discussed herein, the second and additional liquid crystal layers may have a different composition and/or thickness than the first liquid crystal layer, resulting in tilt angles of different magnitudes for each layer.

It will be appreciated that the liquid crystal molecules may be polymerizable in some embodiments and, once polymerized, may form a network with other liquid crystal molecules. For example, the liquid crystal molecules may be linked by chemical bonds or linking chemical species to other liquid crystal molecules. For ease of description, the term "liquid crystal molecule" is used herein to refer to the liquid crystal molecules before polymerization and to the liquid crystal domains formed by these molecules after polymerization, as appropriate. In some embodiments, once joined together, the liquid crystal molecules may form liquid crystal domains having substantially the same orientations and locations as before being linked together.

Without being limited by theory, different tilt angles may result in different peak efficiencies for diffracting incident light of different incident angles. By providing liquid crystal grating structures having liquid crystal sublayers with different tilt angles (e.g., by modifying the twist angle of the liquid crystal molecules of the sublayers of the liquid crystal grating to achieve different tilt angles) different peak efficiencies may be blended together to achieve a wide range of incident angles for which the stack of liquid crystal grating structures is highly efficient for diffracting light. Advantageously, as a result, the amount of light redirected by the liquid crystal grating structure may be increased.

Without being limited by theory, the diffraction angle of incident light is believed to be substantially proportional (e.g., approximately equal) to the tilt angle ($\theta$) in some embodiments. In other words, the angle at which light is diffracted by the in-coupling optical elements into the waveguide may be proportional (e.g., approximately equal) to the tilt angle ($\theta$). Accordingly, the liquid crystal grating structures included in the in-coupling optical elements can be configured by adjusting the amount and/or type of chiral dopants incorporated into the sublayers, varying the thickness, etc. to provide a desired tilt angle ($\theta$), such as, for example in a range between about ±85 degrees. In some embodiments, the diffractive optical elements can be configured to diffract incident light with high efficiency (e.g., diffraction efficiency greater than or equal to about 40%) at incident angles in a range of about ±30 degrees around the Bragg angle.

In addition, it will be appreciated that changing the grating period (e.g., the periodicity of individual liquid crystal molecules) may change the wavelengths of light that are most efficiently diffracted by a liquid crystal grating structure. In some embodiments, multiple grating structures, having different grating periods, may be used to diffract light of different wavelengths. Such grating structures may be stacked vertically and/or disposed on the same vertical level (e.g., laterally spaced-apart from one another).

In some embodiments, the diffractive optical elements formed by the grating structures may be utilized as constituent parts of a display system. The display system may include a waveguide, and an image injection device configured to direct a light stream into the waveguide. The diffractive optical element may be used as one or more of an in-coupling optical element, an out-coupling optical element, and an optical element for receiving incident light propagating in the waveguide and for redirecting that incident light so that the redirected light continues to propagate through the waveguide by total internal reflection. Examples of the latter type of optical element include pupil expanders such as orthogonal pupil expanders (OPEs).

In some embodiments, the diffractive optical elements may be used to in-couple, out-couple, and/or redirect light propagating within the waveguide. The light may be light of a single wavelength or a single range of wavelengths. In some other embodiments, the light may be a light stream that is part of a multiplexed light stream that includes a plurality of light streams having different light properties (e.g., each stream may have a different wavelength). For example, the waveguide may include the diffractive optical elements, which may be configured to selectively redirect a light stream formed of light having a particular light property (e.g., a first wavelength), while being substantially transmissive to one or more other streams of light (e.g., having wavelengths different from the first wavelength). In some embodiments, the waveguide is part of a stack of waveguides, which can include a second waveguide including in-coupling optical elements configured to selectively turn a second of the streams of light while being transmissive to one or more other streams of light. In some embodiments, the in-coupling diffractive optical elements of the waveguide are configured to transmit at least one of the streams of light to the in-coupling diffractive optical elements of the second waveguide.

Reference will now be made to the figures, in which like reference numerals refer to like parts throughout. It will be appreciated that embodiments disclosed herein include optical systems, including display systems, generally. In some embodiments, the display systems are wearable, which may advantageously provide a more immersive VR or AR experience. For example, displays containing one or more waveguides (e.g., a stack of waveguides) may be configured to be worn positioned in front of the eyes of a user, or viewer. In some embodiments, two stacks of waveguides, one for each eye of a viewer, may be utilized to provide different images to each eye.

Example Display Systems

Figure 2:
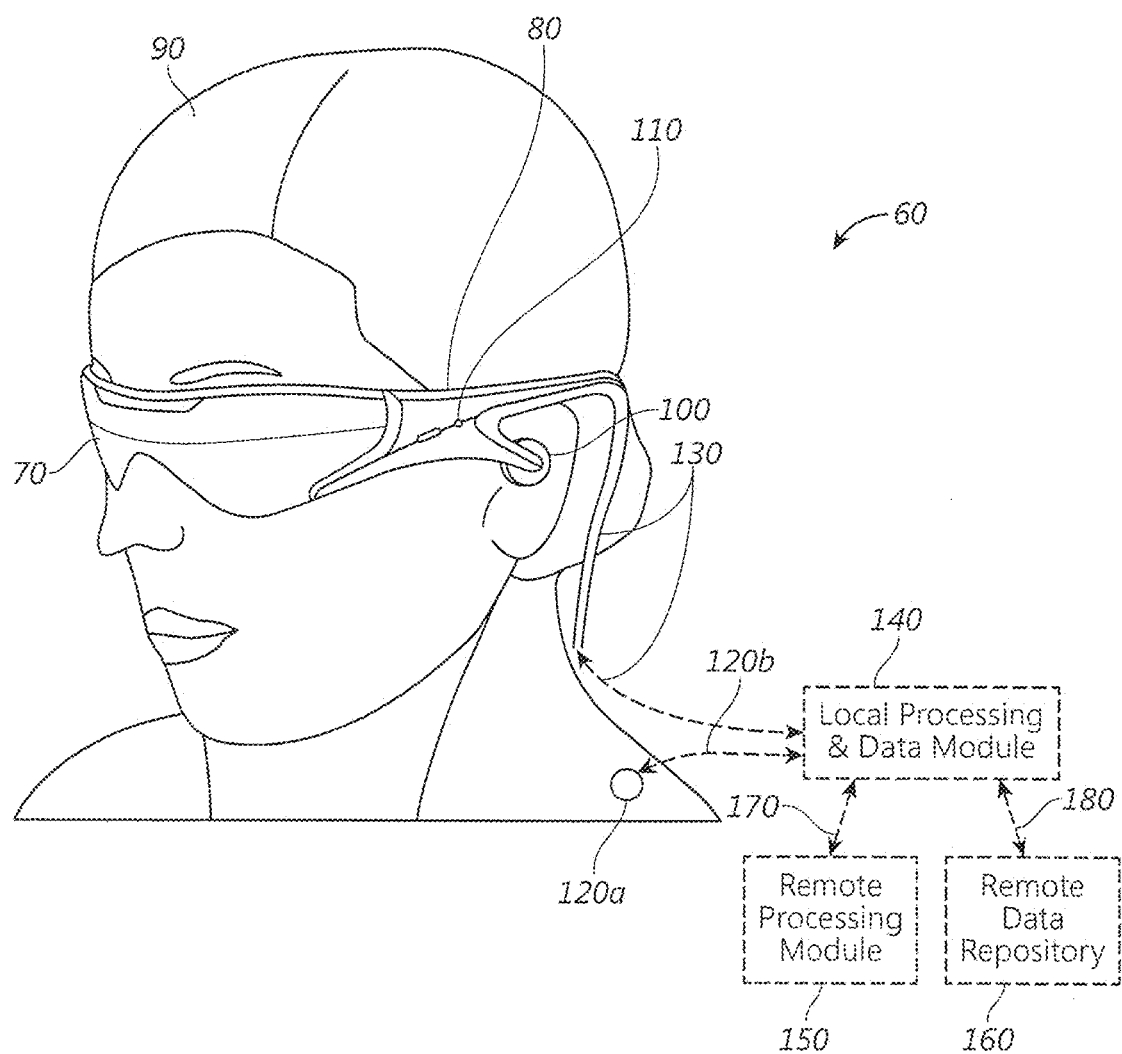
FIG. 2 illustrates an example of a wearable display system.

FIG. 2 illustrates an example of wearable display system 60. The display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, is positioned adjacent the other ear canal of the user to provide stereo/shapeable sound control). In some embodiments, the display system may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120*a*, which may be separate from the frame 80 and attached to the body of the user 90 (e.g., on the head, torso, an extremity, etc. of the user 90). The peripheral sensor 120*a* may be configured to acquire data characterizing the physiological state of the user 90 in some embodiments. For example, the sensor 120*a* may be an electrode.

With continued reference to FIG. 2, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120*a* may be operatively coupled by communications link 120*b*, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 2, in some embodiments, the remote processing module 150 may comprise one or more processors configured to analyze and process data and/or image information. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module.

Figure 3:
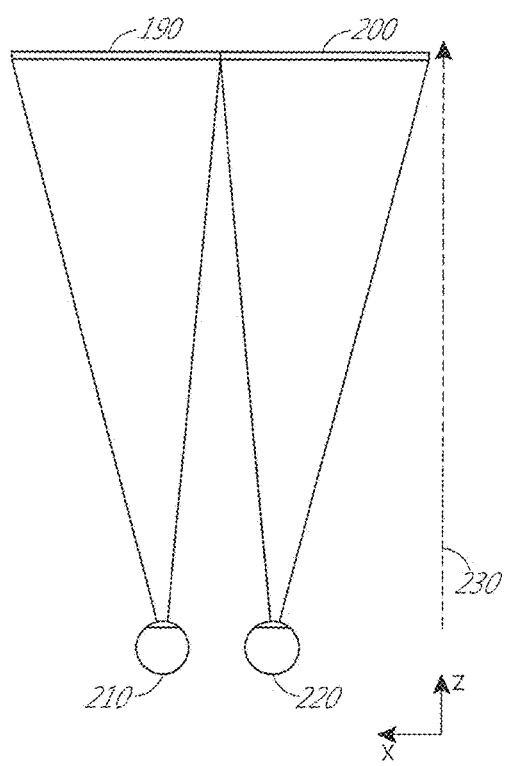
FIG. 3 illustrates a conventional display system for simulating three-dimensional imagery for a user.

The perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 190, 200—one for each eye 210, 220—are outputted to the user. The images 190, 200 are spaced from the eyes 210, 220 by a distance 230 along an optical or z-axis that is parallel to the line of sight of the viewer. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide a different presentation of a scene, but with the eyes viewing all the image information at a single accommodated state, and work against the "accommodation-vergence reflex." Display systems that provide a better match between accommodation and vergence may form more realistic and comfortable simulations of three-dimensional imagery contributing to increased duration of wear and in turn compliance to diagnostic and therapy protocols.

Figure 4:
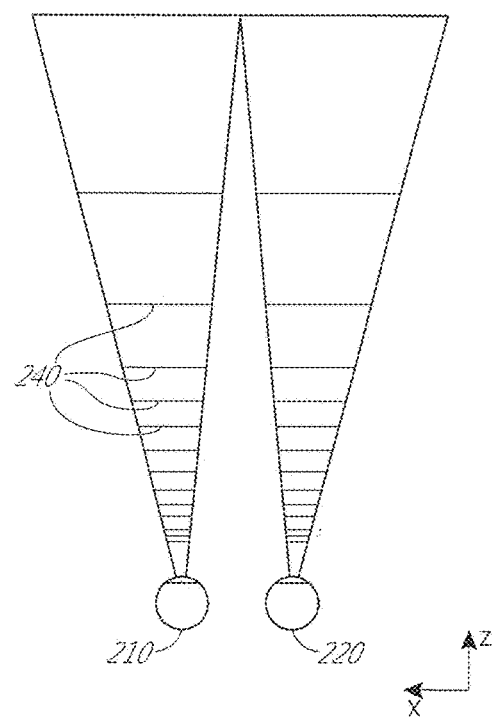
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 210, 220 on the z-axis are accommodated by the eyes 210, 220 so that those objects are in focus. The eyes 210, 220 assume particular accommodated states to bring into focus objects at different distances along the z-axis. Consequently, a particular accommodated state may be said to be associated with a particular one of depth planes 240, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 210, 220, and also by providing different presentations of the image corresponding to each of the depth planes. While shown as being separate for clarity of illustration, it will be appreciated that the fields of view of the eyes 210, 220 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
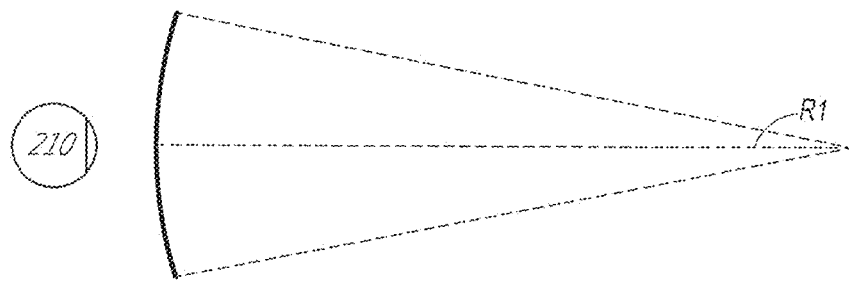
FIGS. 5A-5C illustrate relationships between radius of curvature and focal radius.
Figure 5B:
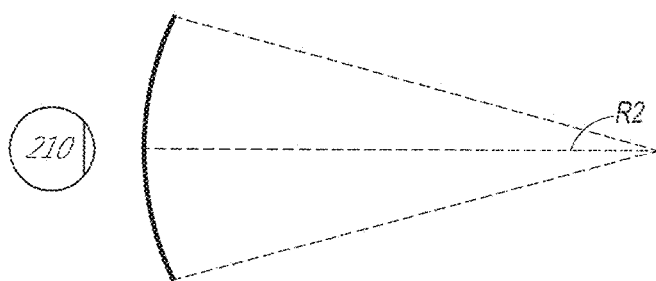
Figure 5C:
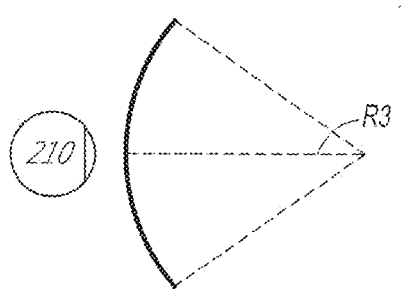

The distance between an object and the eye 210 or 220 may also change the amount of divergence of light from that object, as viewed by that eye. FIGS. 5A-5C illustrate relationships between distance and the divergence of light rays. The distance between the object and the eye 210 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the viewer's eye 210. While only a single eye 210 is illustrated for clarity of illustration in FIGS. 5A-5C and other figures herein, it will be appreciated that the discussions regarding eye 210 may be applied to both eyes 210 and 220 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
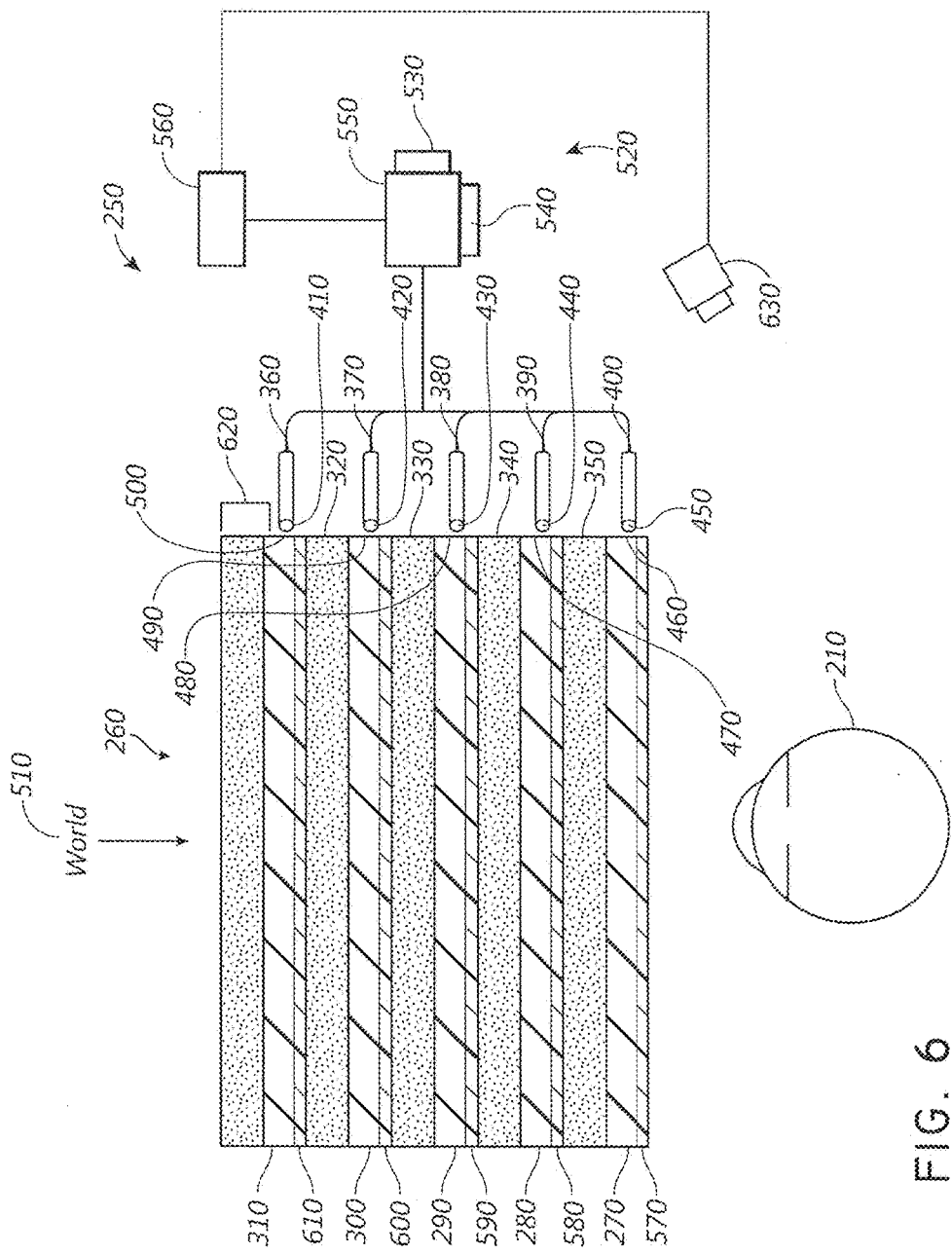
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 2, with FIG. 6 schematically showing some parts of that system 60 in greater detail. For example, the waveguide assembly 260 may be part of the display 70 of FIG. 2. It will be appreciated that the display system 250 may be considered a light field display in some embodiments.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, the each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310. Examples of spatial light modulators include liquid crystal displays (LCD) including a liquid crystal on silicon (LCOS) displays.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 2) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it can reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This can provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 2) and may be in electrical communication with the processing modules 140 and/or 150, which may process image information from the camera assembly 630 to make various determinations regarding, e.g., the physiological state of the user, as discussed herein. It will be appreciated that information regarding the physiological state of user may be used to determine the behavioral or emotional state of the user. Examples of such information include movements of the user and/or facial expressions of the user. The behavioral or emotional state of the user may then be triangulated with collected environmental and/or virtual content data so as to determine relationships between the behavioral or emotional state, physiological state, and environmental or virtual content data. In some embodiments, one camera assembly 630 may be utilized for each eye, to separately monitor each eye.

Figure 7:
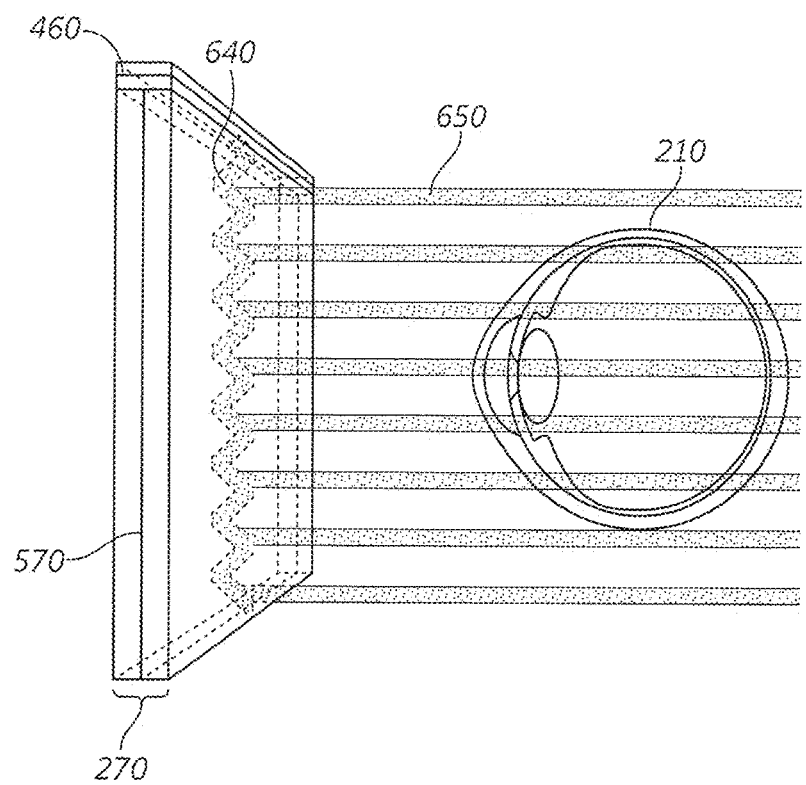
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide including out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
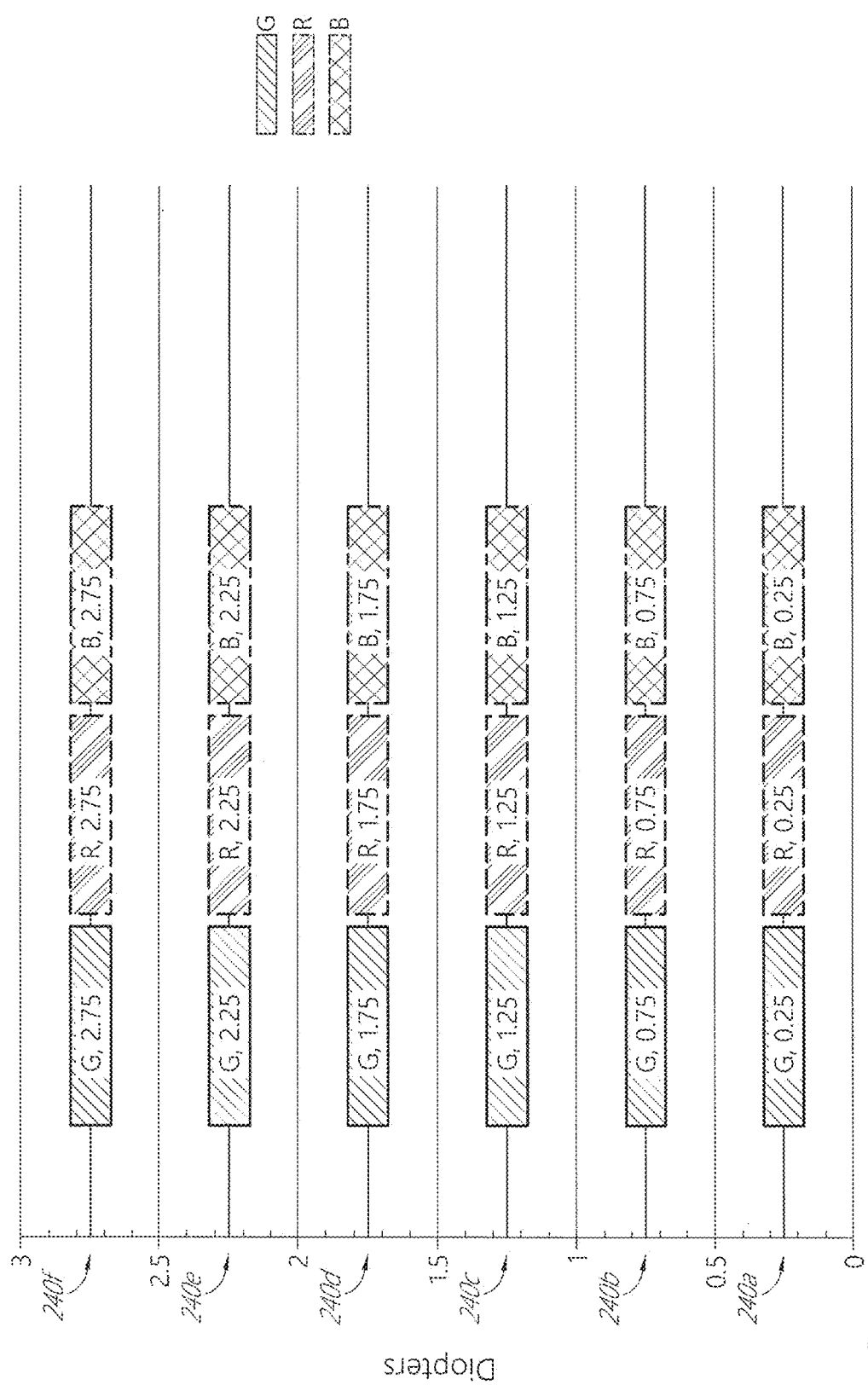
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue. In some embodiments, features 320, 330, 340, and 350 may be active or passive optical filters configured to block or selectively light from the ambient environment to the viewer's eyes.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
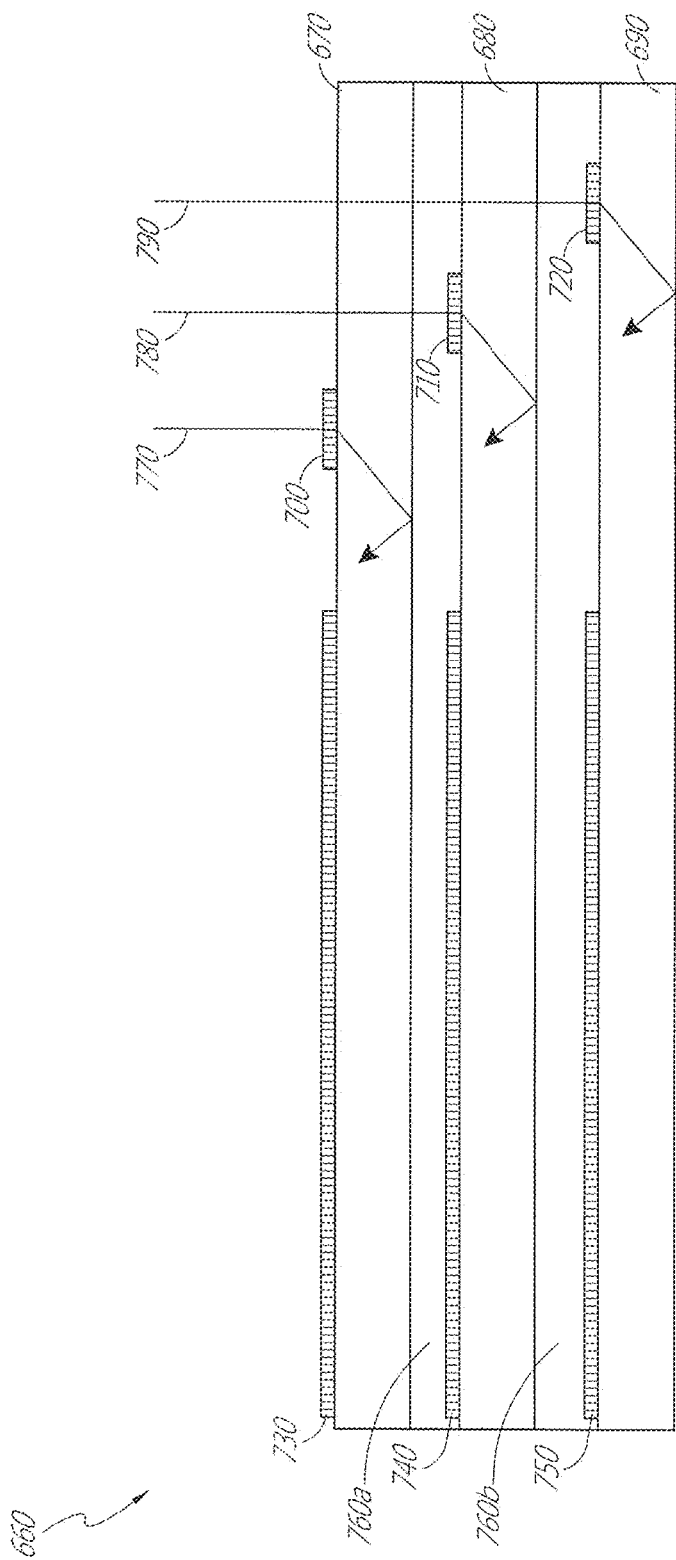
FIG. 9A illustrates a cross-sectional side view of an example of a set of stacked waveguides that each includes an in-coupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate TIR of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR.

For example, in-coupling optical element 700 may be configured to deflect ray 770, which has a first wavelength or range of wavelengths. Similarly, the transmitted ray 780 impinges on and is deflected by the in-coupling optical element 710, which is configured to deflect light of a second wavelength or range of wavelengths. Likewise, the ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670,

680, 690 by TIR until impinging on the waveguide's corresponding light distributing elements 730, 740, 750.

Figure 9B:
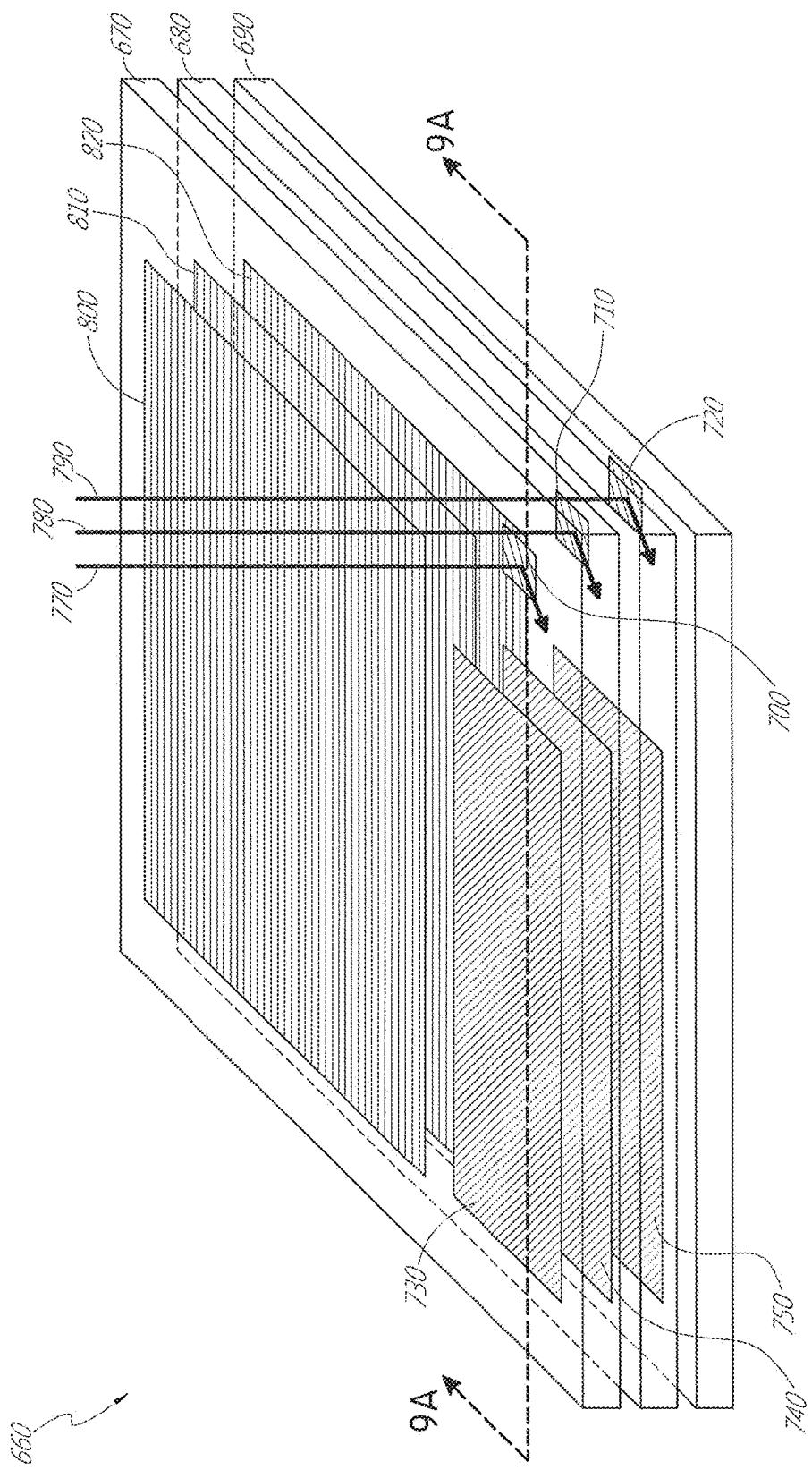
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's both deflect or distribute light to the out-coupling optical elements 800, 810, 820 and also increase the beam or spot size of this light as it propagates to the out-coupling optical elements. In some embodiments, e.g., where the beam size is already of a desired size, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
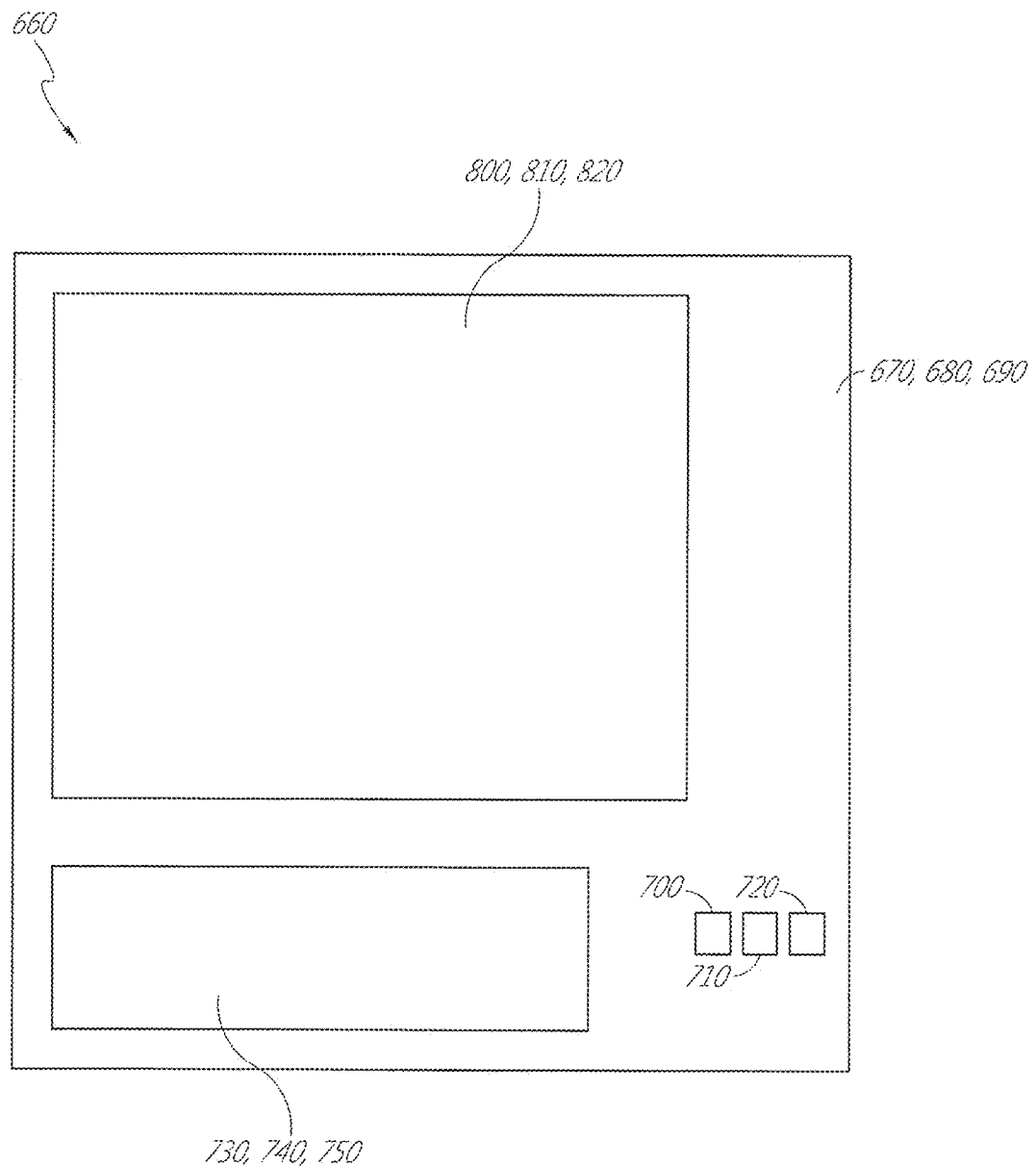
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Example Liquid Crystal Polarization Gratings

It will be appreciated that liquid crystal polarization gratings used for light steering can preferably diffract or redirect light at large angles relative to a normal to the grating to, e.g., facilitate the in-coupling of light into a waveguide such that the light propagates through the waveguide by TIR. Conventional liquid crystal polarization gratings, however, may have difficulties redirecting light at large angles while also achieving high diffraction efficiencies. It has been found that inducing twist along the thickness of the gratings, which may cause sublayers of the gratings to be shifted to define a tilt angle, may provide high diffractive efficiency while achieving large angle diffraction or light redirection. The diffractive efficiencies of such gratings, however, are highly dependent upon the angle of incidence of light on the gratings. Advantageously, it has also been found that varying the tilt angle provides gratings with high efficiency over a wide range of incident angles. In some embodiments, the range of incident angles over which high efficiency is achieved may be increased by stacking multiple gratings structures together, with each grating structure having a tilt angle of a different magnitude.

Advantageously, the various diffractive optical elements discussed herein may be grating structures, including liquid crystal grating structures such as liquid crystal polarization gratings. The grating structures are preferably configured to provide high diffraction efficiency for a wide range of incident angles (e.g., between about ±20-degrees about the Bragg angle, between about ±30-degrees about the Bragg angle, between about ±45-degrees about the Bragg angle, etc.). Accordingly, the grating structures described herein may advantageously have low sensitivity to the angle of incidence of light. The grating structures may be fabricated using a variety of methods including but not limited to aligning liquid crystal molecules in a layer of polymerizable liquid crystal material using a patterned alignment layer, which may underlie the liquid crystal material.

In some embodiments, the liquid crystal grating structures may form light redirecting elements for the various waveguides of the waveguide stacks 260 (FIG. 6) or 660 (FIGS. 9A-9C). For example, such liquid crystal grating structures may advantageously be applied to form the in-coupling optical elements 3012, 3014, 3016, and/or 3018 (FIG. 8A-8E) and/or the in-coupling optical elements 700, 710, 720; the light distributing elements 730, 740, 750; and/or the out-coupling optical elements 800, 810, 820 (FIGS. 9A-9C). In addition to AR display systems, it will be appreciated that the liquid crystal grating structures may be applied in other applications in which diffractive optical elements are utilized. For example, the liquid crystal grating structures may be utilized to steer light in other optical systems, including VR display systems, flat panel computer monitors or televisions, illuminated signs, imaging systems, etc.

It will be appreciated that liquid crystals are partly ordered materials whose molecules are often shaped like rods or plates that may be aligned along a certain direction. The direction and pattern along which the molecules of the liquid crystal are oriented may be manipulated by the use of a template pattern that interacts with the molecules (e.g., through steric and/or anchoring energy interactions). In addition, the liquid crystal materials may comprise chiral dopants and/or reactive mesogens (RMs). The chiral dopants may cause rotation of the liquid crystal molecules over the thickness of the liquid crystal material by a twist angle ($\Phi$) and the reactive mesogens may allow the orientations and positions of the liquid crystal molecules to be fixed through polymerization.

Figure 10A:
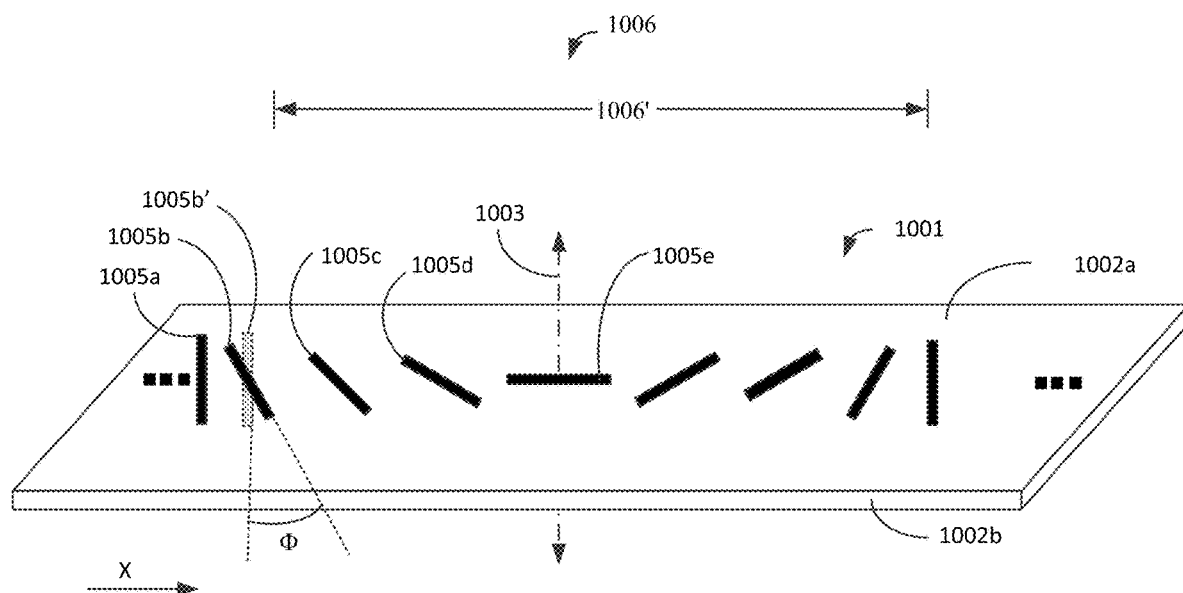
FIG. 10A illustrates a top-down perspective view of an example of a grating structure comprising a plurality of sublayers of liquid crystal material.
Figure 10B:
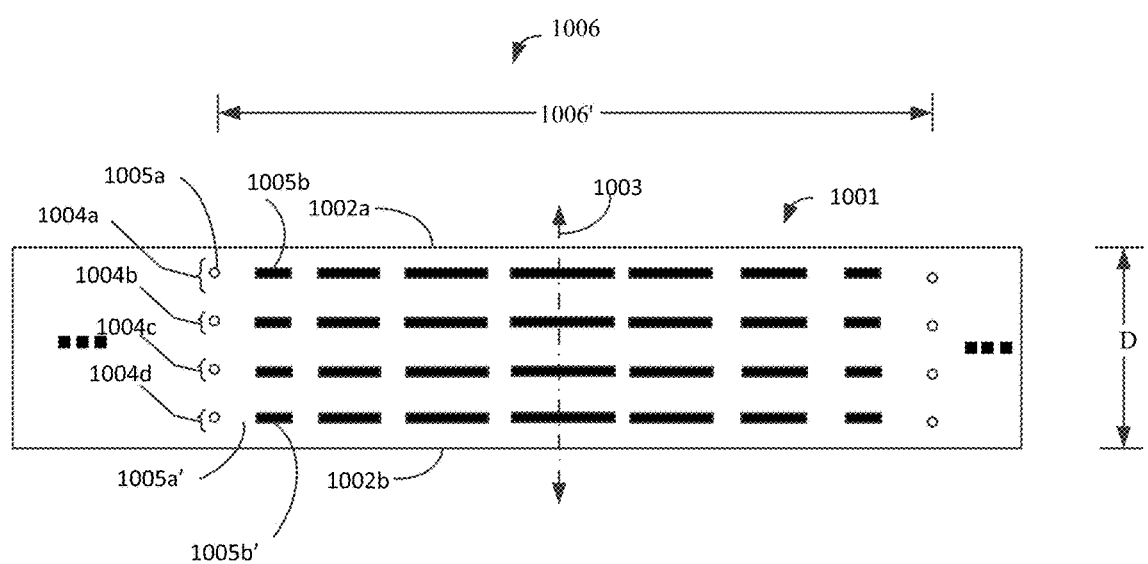
FIG. 10B illustrates a side view of the grating structure of FIG. 10A.

FIG. 10A illustrates a top-down perspective view of an example of a grating structure 1001 comprising a first major surface 1002a and a second major surface 1002b. A plurality of sublayers of liquid crystal material (e.g., sublayers 1004a, 1004b, 1004c and 1004d) may be included between the first surface 1002a and the second surface 1002b as depicted in FIG. 10B, which is a side view of the structure illustrated in FIG. 10A. Each sublayer may be defined by a plurality of liquid crystal molecules arranged in a common plane and, as such, each sublayer is only a single liquid crystal molecule thick. The sublayers form an aggregate layer of liquid crystal material having a thickness D, which may be equal to the total thickness of all sublayers. While four sublayers are illustrated, it will be appreciated that the grating structure 1001 may include more or fewer sublayers.

With continued reference to FIG. 10A, the grating structure 1001 has a surface normal 1003 intersecting the first and the second surfaces 1002a and 1002b. As noted above, in some embodiments, the liquid crystal material may have a twist angle $\Phi$ defined by the angular rotation between a liquid crystal molecule (e.g., 1005b) of an uppermost sublayer 1004a of the grating structure 1001, and an underlying liquid crystal molecule (e.g., 1005b') of a lowermost sublayer 1004d of the grating structure 1001. Without being limited by theory, interactions between neighboring liquid crystal molecules may cause the orientations of the molecules to vary in a regular progression across the grating structure 1001, along the lateral axis (X). Thus, the liquid crystal molecules may form repeating units, each of which has a similar progression of liquid crystal orientations along the X-axis. As a result, groups of liquid crystal molecules for the repeating units in each of the sublayers 1004a-1004d may have a periodicity ($\Lambda$) equal to the lateral distance 1006' between two consecutive liquid crystal molecules having the same orientation, as seen in a side and/or top-down view.

With reference again to FIGS. 10A and 10B, the grating structure 1001 can comprise a chiral nematic liquid crystal material in some embodiments. For example, the plurality of sublayers of liquid crystal material may comprise a cholesteric liquid crystal material. Preferably, the liquid crystal material is polymerizable. As discussed herein, the liquid crystal material may comprise a reactive mesogen (RM), such as, for example, liquid crystalline di-acrylate. As also discussed herein, the grating structure 1001 preferably also includes chiral dopants, which may be utilized to influence the twist angle $\Phi$ of the liquid crystal molecules. Examples of chiral dopants include cholesteryl benzoate, cholesteryl nonanoate, cholesteryl chloride, and cholesteryl oley carbonate.

With reference to FIG. 10B, a single repeating unit of each sublayer 1004a, 1004b, 1004c, and 1004d is illustrated. The repeating units 1006 have a periodicity of length 1006'. While the repeating units are illustrated completely directly vertically aligned for ease of discussion, it will be appreciated that the twisting the liquid crystal molecules over the thickness of the grating structure 1001 may cause the repeating units of different sublayers to be laterally shifted relative to one another.

Figure 11:
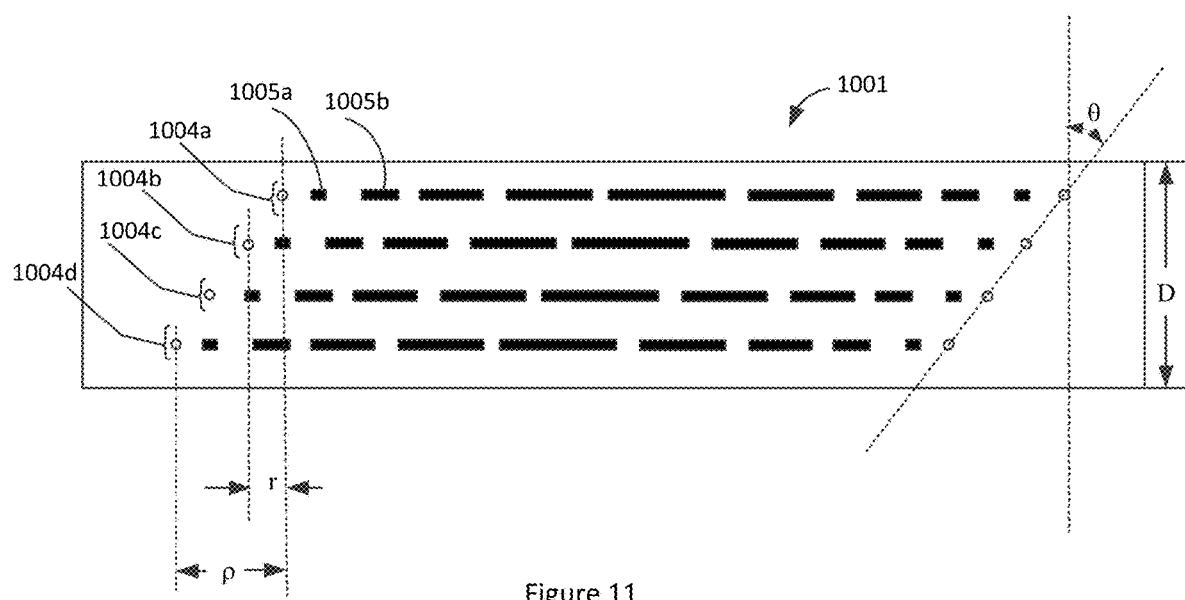
FIG. 11 illustrates an example of a grating structure comprising a plurality of sublayers of liquid crystal material having laterally offset repeating units of liquid crystal molecules.

With reference to FIG. 11, in some embodiments, the sublayers 1004a, 1004b, 1004c, and 1004d of liquid crystal material may be laterally offset with respect to each other. The offset may be such that a grating optic axis that passes through corresponding liquid crystal molecules (that is, liquid crystal molecules having the same orientation) in each of the plurality of sublayers 1004a, 1004b, 1004c, and 1004d is tilted at an angle $\theta$ with respect to a normal to the lateral axis X, and this normal may also be the normal to a major surface of the polarization grating structure. Accordingly, the sublayers 1004a, 1004b, 1004c, and 1004d form a tilted grating pattern having a grating optic axis that is tilted at an angle $\theta$ with respect to the normal to a major surface of the polarization grating structure 1001. In some embodiments, without being limited by theory, such a tilted grating pattern may diffract normally incident light at a high efficiency when the grating period satisfies the following condition with the wavelength $\lambda$, the average refractive index n, the grating period $\Lambda$ (corresponding to the length 1006') and the tilt angle $\theta$ of the grating optic axis of the grating structure in equation (1) below.

$$\sin \lambda \cong 2n\Lambda \sin \theta \qquad (1)$$

The twist angle $\Phi$ may be determined from the tilt angle $\theta$ of the grating optic axis, the twist angle $\Phi$, the thickness of the grating structure D and the grating period $\Lambda$ in using equation (2) below.

$$\Phi = \pi D/\Lambda \tan \theta \qquad (2)$$

With continued reference to FIG. 11, the liquid crystal molecules in the plurality of sublayers 1004a, 1004b, 1004c, and 1004d can form repeating units. The periodicity of the repeating units can be equal to the periodicity ($\Lambda$) of the liquid crystal molecules. The repeating units in each of the plurality of sublayers of liquid crystals may be laterally offset with respect to the repeating units in an immediately adjacent sublayer by a shift distance r. It will be appreciated that the tilt angle ($\theta$) may be determined based upon the angle of formed between a normal to a major surface of the grating structure 1001 and an imaginary line extending between similar points in repeating liquid crystal units of directly neighboring sublayers. For example, the imaginary line may be defined by the right hand edges of the repeating units, as illustrated.

Without being limited by theory, when the liquid crystal molecules of the grating structure 1001 have chirality, the orientation of the anisotropy of the liquid crystal material is rotated along the thickness of the polarization grating structure and the amount of the rotation (also known as a twist angle of the liquid crystal material) is determined by the helical pitch P that is a distance for 360 degree rotation of the liquid crystal anisotropy axis. In some embodiments, the grating structure 1001 has a uniform and continuous cycloidal anisotropy profile, and a rotation of the anisotropy along the thickness D of the grating structure 1001 leads to a lateral shift (ρ) of the anisotropy profile along the grating direction which gives rise to a tilt of the grating optic axis with respect to the major surface normal of the grating structure as shown in FIG. 11. As discussed above regarding equation (2), the tilt angle θ of the sublayers 1004a, 1004b, 1004c, 1004d depends on the twist angle Φ of the liquid crystal molecules, the thickness D of the grating structure 1001, and the grating period Λ. Accordingly, the tilt angle of the grating optic axis may be varied by varying the twist angle of the liquid crystal molecules, the thickness D of the grating structure, and/or the periodicity Λ of the grating structure. Where the periodicity Λ and the thickness D are constant over the grating structure, the twist angle of the liquid crystal molecules of the grating structure may be varied to change the tilt angle. It will be appreciated that, in turn, the twist angle may be varied based upon the chiral dopants doping the grating structure and the thickness D of the grating structure.

As discussed herein, while grating structures such as the grating structure 1001 advantageously provide high diffraction efficiency and large angle diffraction, these grating structures may achieve this highly efficient large angle diffraction for only a limited range of incident angles. Undesirably, light incident on the grating structure outside of this limited range of incident angles is not efficiently diffracted. To increase the large angle diffraction efficiency for light of different incident angles, multiple liquid crystal grating structures with different tilt angles may be utilized. Preferably, these grating structures are formed in a stack.

Figure 12A:
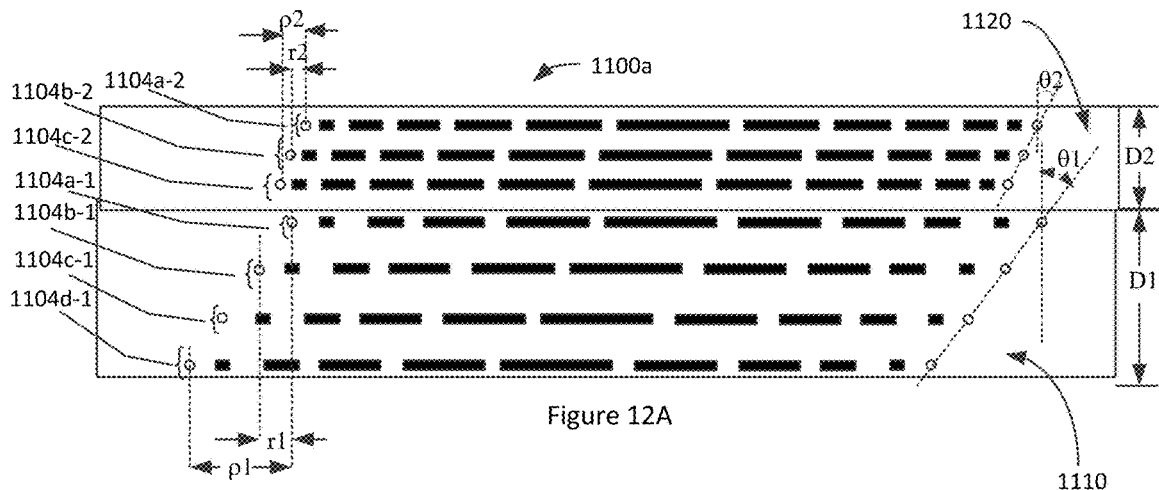
Figures 1, 12B:
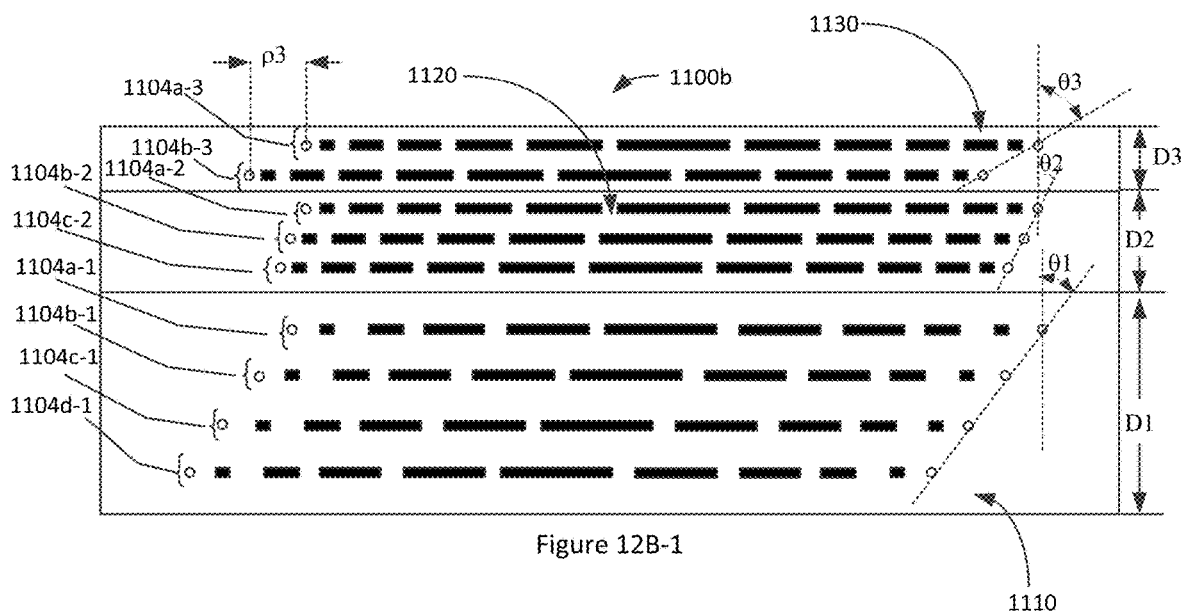
Figures 2, 12B:
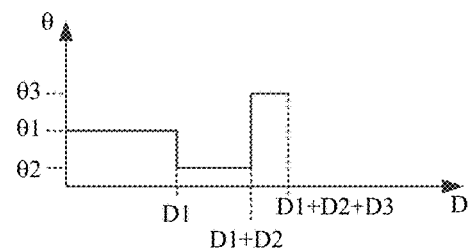

Such stacks are illustrated in FIGS. 12A and 12B-1. FIG. 12A depicts an example of a liquid crystal polarization grating stack 1100a comprising two liquid crystal polarization grating (LCPG) structures 1110 and 1120. The first LCPG structure 1110 comprises a plurality of liquid crystal sublayers 1104a-1, 1104b-1, 1104c-1 and 1104d-1 that are laterally offset with respect to each other by a distance r1 such that repeating units formed by pluralities of liquid crystal molecules are laterally shifted by a distance ρ1 over the thickness D1, which results in a tilt angle θ1 with respect to the surface normal of the first LCPG structure. The second LCPG structure 1120 is disposed over the first LCPG structure 1110 and preferably directly contacts the first LCPG structure 1110. The second LCPG 1120 structure comprises a plurality of liquid crystal sublayers 1104a-2, 1104b-2, and 1104c-2 that are laterally offset with respect to each other by a distance r2 such that repeating units formed by pluralities of liquid crystal molecules are laterally shifted by a distance ρ2 over the thickness D2, which results in the second grating optic axis being tilted by an angle θ2 with respect to the surface normal of the second LCPG structure. Preferably, the magnitudes of the tilt angles θ1 and θ2 are different.

With continued reference to FIG. 12A, the lateral shift ρ2 of the grating structure 1120 may be smaller than the lateral shift ρ1 of the grating structure 1110. As a result, the tilt angle θ2 of the grating structure 1120 is smaller than the tilt angle θ1 of the grating structure 1110.

FIG. 12B-1 illustrates an example of a grating structure in which a third LCPG structure 1130 is disposed over the second LCPG structure 1120. The third LCPG structure 1130 may comprise a plurality of liquid crystal sublayers 1104a-3 and 1104b-3 that are laterally offset with respect to each other such that repeating units formed by pluralities of liquid crystal molecules in the sublayers 1104a-3 and 1104b-3 are laterally shifted by a distance ρ3 over the thickness D3, which results in a third tilt angle θ3 with respect to the surface normal of the third LCPG structure. It will be appreciated that the lateral shift ρ3 of the third LCPG structure is greater than the lateral shift ρ1 of the first LCPG structure. As a result, the tilt of the third grating optic axis θ3 is greater than the tilt of the first grating optic axis θ1.

FIG. 12B-2 is an example of a plot of the tilt angles and thicknesses of the grating structure stack illustrated in FIG. 12B-1. Without being limited by theory, the tilt angle may be understood to correspond to angle of the grating optic axis, and the plot shown in FIG. 12B-2 may be understood to show the variation of the optic axis across the grating structure stack.

Various embodiments of the liquid crystal polarization grating structures described herein may be configured to diffract a variety of wavelengths in the ultraviolet, visible and infra-red spectral ranges. For example, the grating structures can be configured to diffract incident light having a wavelength in a range between about 300 nm and about 10 µm. In some embodiments, to achieve high diffraction angles, it may be desirable for the periodicity Λ of the grating structure to be approximately equal to or even smaller than the wavelength of the incident light. Accordingly, the periodicity Λ of the grating structure may be between about 200 nm and about 100 µm depending on the wavelength range that the grating structure is configured to operate on. For example, the periodicity Λ of the grating structure may be between about 200 nm and about 350 nm; between about 330 nm and about 410 nm; between about 370 nm and about 480 nm; between about 450 nm and about 510 nm; between about 500 nm and about 570 nm; between about 550 nm and about 700 nm; between about 650 nm and about 1 µm; between about 980 nm and about 3 µm; between about 1.3 µm and about 3.2 µm; between about 2.3 µm and about 5 µm; between about 5 µm and about 10 µm; between about 5 µm and about 100 µm; or any value in these ranges or sub-ranges. Preferably, in display applications, the grating structure is configured to diffract visible light so that the light propagates away from the grating structure at wide diffraction angles, e.g., angles suitable for TIR within a waveguide on which the grating structure may be formed.

In some embodiments, the thickness D (e.g., D1, D2 and D3) of the various embodiments of the LCPG structures described herein may be in a range between about 100 nm to about 50 µm. For example, the thickness D of the grating structure may be in a range between about 100 nm and about 350 nm; between about 320 nm and about 510 nm; between about 450 nm and about 600 nm; between about 550 nm and about 800 nm; between about 700 nm and about 1 µm; between about 1 µm and about 5 µm; between about 3 µm and about 10 µm; between about 7.5 µm and about 20 µm; between about 15 µm and about 30 µm; between about 25 µm and about 50 µm; or any value in these ranges or sub-ranges. In some embodiments, the thicknesses of the gratings structures forming a stack differ by about 0 to 10 µm, including about 0 to 100 nm; about 100 nm to 1 µm; about 1 µm to 2 µm; or about 2 µm to 10 µm.

In some embodiments, the tilt angle θ (e.g., θ1, θ2 and θ3) of the grating optic axis may be in a range between −85 degrees and about 85 degrees. For example, the tilt angle θ may be in a range between −10 degrees and about 10 degrees; between −20 degrees and about 20 degrees; between −35 degrees and about 35 degrees; between −45 degrees and about 45 degrees; between −50 degrees and about 50 degrees; between −65 degrees and about 65 degrees; between −75 degrees and about 75 degrees; or any value in these ranges or sub-ranges. Preferably, tilt angles between the gratings structures forming a stack differ by about 0 to ±90 degrees, including about 0 to ±10 degrees;

about ±10 degrees to ±20 degrees; about ±20 degrees to ±30 degrees; about ±30 degrees to ±40 degrees; about ±40 degrees to ±50 degrees; about ±50 degrees to ±60 degrees; about ±60 degrees to ±70 degrees; about ±70 degrees to ±80 degrees; or about ±80 degrees to ±90 degrees.

In some embodiments, the pattern shift distance ρ of the grating pattern across the thickness of the grating structure (e.g., ρ1, ρ2 and ρ3) may be in a range between 1 nm and about 50 µm. For example, the pattern shift distance ρ of the grating structure can vary between about 1 nm and about 20 nm; about 10 nm and about 50 nm; about 25 nm and about 125 nm; about 100 nm and about 350 nm; between about 320 nm and about 510 nm; between about 450 nm and about 600 nm; between about 550 nm and about 800 nm; between about 700 nm and about 1 µm; between about 1 µm and about 5 µm; between about 3 µm and about 10 µm; between about 7.5 µm and about 20 µm; between about 15 µm and about 30 µm; between about 25 µm and about 50 µm; or any value in these ranges or sub-ranges.

In some embodiments, all sublayers of all of the grating structures of a grating structure stack may be shifted in the same direction as depicted in FIGS. 10A, 10B, 11, 12A and 12B-1. For examples, the repeating liquid crystal molecules units of each sublayer may be shifted to the same side, e.g., to the left or to the right. For example, as depicted in FIGS. 12A and 12B-1 the grating optic axis of the different polarization grating stacks are all tilted to the right of the surface normal. Tilting the grating optical axis of the different sublayers to the same side can be advantageous in increasing diffraction efficiencies over a wider range of input angles as explained below with reference to FIGS. 12C-1, 12C-2, 12D-1, and 12D-2.

Figures 1, 12C:
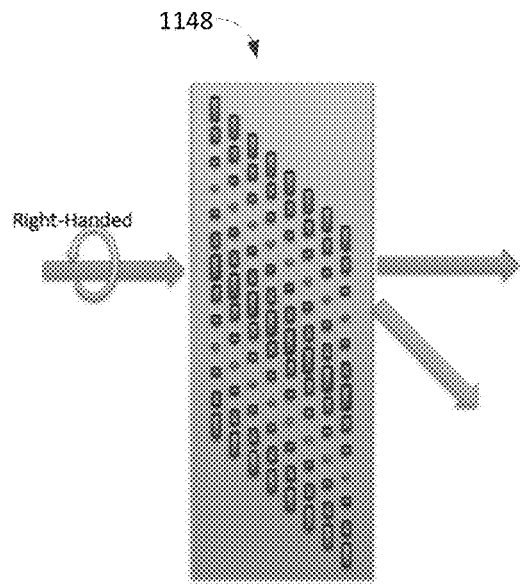
Figures 2, 12C:
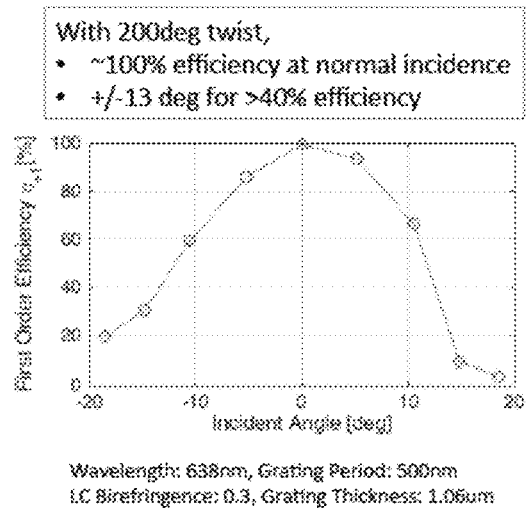
Figures 1, 12D:
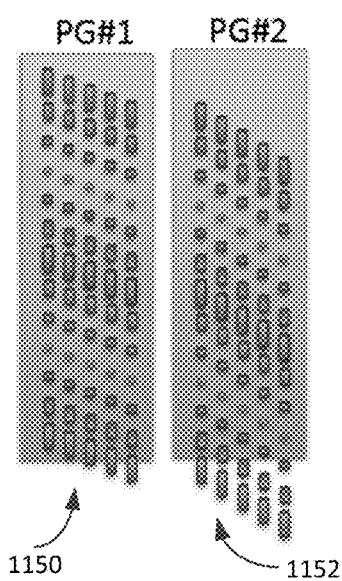
Figures 2, 12D:
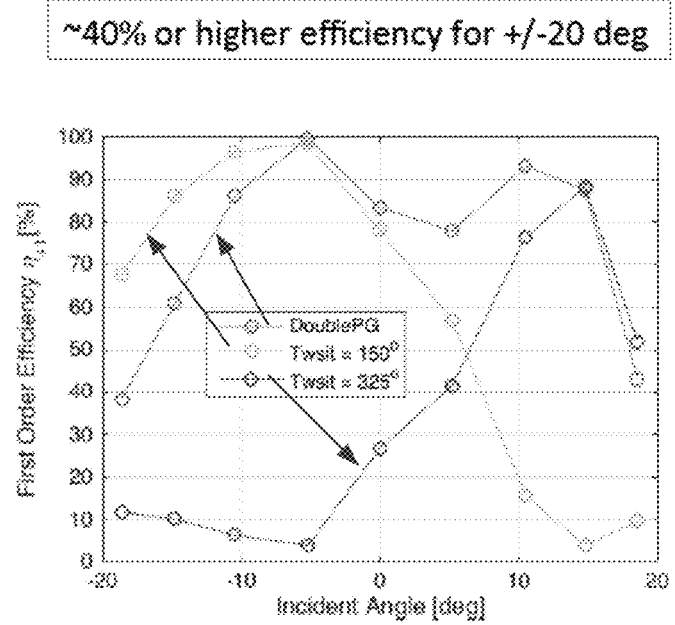

Reference will now be made to FIGS. 12C-1, 12C-2, 12D-1 and 12D-2, which illustrate the advantageous diffraction efficiency of a stack of grating structures having different tilt angles, as disclosed herein. FIG. 12C-2 illustrates the diffraction efficiency in the first order of a single liquid crystal polarization grating structure 1148 depicted in FIG. 12C-1. The diffraction efficiency has a peak for light incident on the grating structure at an angle parallel to the normal to the major surface of the grating structure (that is, at an angle of 0 degrees relative to the normal). The peak efficiency drops off rapidly, however, as the angle of incidence changes. It has been found, however, that the peak diffraction efficiency may be shifted by varying the tilt angle. Notably, as seen in FIG. 12D-2, a stack of two liquid crystal polarization grating structures 1150 and 1152 depicted in FIG. 12D-1 having different magnitude tilt angles may provide multiple diffraction peaks, thereby effectively expanding the window over which high diffraction efficiency is achieved. In addition, the stacked grating structure may increase the diffraction efficiency for light incident at angles away from these peaks. For example, as shown in FIGS. 12D-1 and 12D-2, the grating structure of the layer 1150 is tilted by a first tilt angle configured to provide high diffraction efficiency for light of incident angles of about −20 degrees to 0 degree and the grating structure of the layer 1152 is tilted on the same side by a second tilt angle configured to provide high diffraction efficiency for light of incident angles of 0 degree to about 20 degrees. Accordingly, diffraction efficiency of light incident in the angular range between ±20 degrees is increased to about 40% as compared to the about 20% diffraction efficiency that was achieved by the single grating structure 1148 shown in FIGS. 12C-1 and 12C-2.

While two liquid crystal polarization grating structures are illustrated to simplify the illustration in FIG. 12D-1, in some embodiments, more than two liquid crystal polarization grating structures, each having tilt angles of different magnitudes and peak diffraction efficiencies for light of different incident angles, may be stacked together to form a liquid crystal polarization grating structure stack. In some embodiments, the grating structure stack has a window (for the angle of incidence of light) of at least about 50 degrees, 40 degrees, or 30 degrees while providing a diffraction efficiency of at least about 40%. Preferably, the diffraction efficiency is greater than about 50%, 60%, or 75% over the window.

As discussed herein, the liquid crystal polarization grating structures may be formed on a substrate, which may be a transmissive waveguide. In some embodiments, the transmissive waveguide maybe transmissive to light of visible wavelengths and may be configured to guide that light internally by TIR. The transmissive waveguide may include in-coupling and out-coupling elements that comprise polarization grating structure comprising plurality of sublayers of liquid crystal material in which repeating units in each liquid crystal sublayer are laterally shifted with respect to corresponding repeating units in an immediately adjacent liquid crystal sublayer to define a tilt angle θ with respect to a normal to a major surface of the polarization grating structure. The in-coupling and out-coupling elements may be disposed on a surface of the waveguide and may be configured to in-couple incident light into a guided mode of the waveguide or to out-couple light propagating within the waveguide. In some other embodiments, the liquid crystal polarization grating structures may be utilized to redirect light propagating within the waveguide, e.g., to change the direction of that light, while allowing that light to continue to propagate within the waveguide.

Example Methods of Making

Figure 13A:
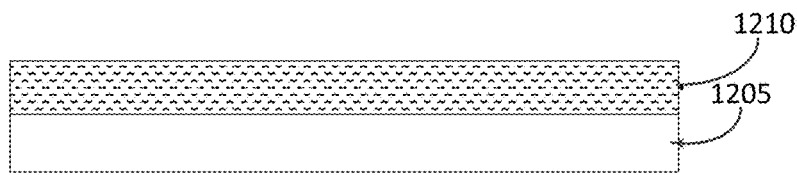
FIGS. 13A-13E illustrate examples of different structures formed during a process for making a stack of grating structures.

With reference to FIGS. 13A-13E, an example of a method for making various liquid crystal polarization grating structures described herein is illustrated. With reference to FIG. 13A, a substrate 1205 having an overlying alignment layer 1210 is provided. The substrate 1205 is preferably optically transmissive. Examples of suitable materials for the substrate include glass, quartz, sapphire, indium tin oxide (ITO), or polymeric materials, including polycarbonate, polyacetate, and acrylic. In some embodiments, the substrate 1205 can be transmissive to light of visible wavelengths.

In some embodiments, the alignment layer 1210 may be a layer that causes the liquid crystal molecules to assume a particular orientation or pattern, for example, due to steric interactions with the liquid crystal molecules, and/or anchoring energy exerted on the liquid crystal molecule by the photo-alignment layer. Examples of materials for the alignment layer 1210 include resist (e.g., photoresist), polymers, and resins. As examples, the alignment layer 1210 may include polyimide, linear-polarization photopolymerizable polymer (LPP), Azo-containing polymers, Courmarine-containing polymers and cinnamate-containing polymers. Preferably, the alignment layer 1210 can include polymerizable liquid crystal material (e.g., reactive mesogens). In some embodiments, the alignment may be deposited on a major surface of the substrate, e.g., by a spin on coating process or jet deposition. It will be appreciated that the major surface may be the largest area surface of the substrate, or may be one of a pair of similarly-sized opposing surfaces each having larger areas than other surfaces.

Figure 13B:
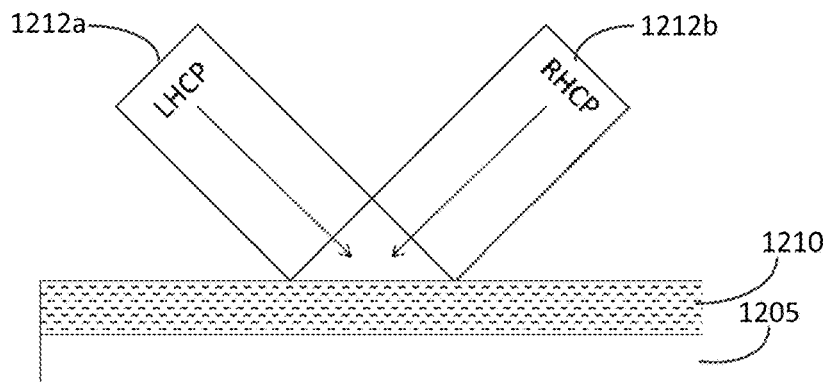

With reference to FIG. 13B, the alignment layer 1210 may subsequently be patterned. The pattern may correspond to the desired grating pattern of the liquid crystal polarization grating (e.g., the pattern may be identical to the desired pattern, or may be an inverse of the desired grating pattern). In some embodiments, the alignment layer may contain light-activated chemical species and patterning may be accomplished by exposing the alignment layer to light of having an appropriate wavelength for activating those chemical species. For example, a polarization interference pattern may be recorded in the alignment layer 1210 by generating two orthogonal circularly polarized light beams (e.g., left handed circularly polarized light beam 1212a and right handed circularly polarized light beam 1212b) and directing those light beams to the alignment layer, which may be formed by a linear polarization photo-polymerizable polymer material.

In some other embodiments, the alignment layer 1210 may be patterned using nano-imprint techniques to create surface relief nano-structures in the alignment layer 1210. For example, the alignment layer 1210 may be formed of a resist material, which is physically contacted and deformed by an imprint reticle that imprints a desired pattern into the alignment layer. In some embodiments, the alignment layer 1210 may then be exposed to light (e.g., UV light) to cure or harden that patterned layer 1210.

Figure 13C:
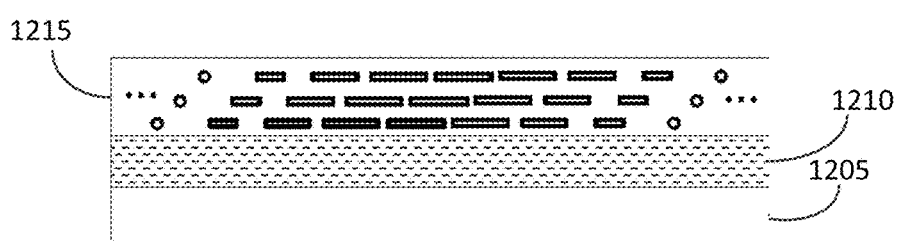

With reference to FIG. 13C, a layer 1215 of liquid crystal material may be deposited on the patterned alignment layer 1210 and allowed to self-organize into sublayers, as discussed herein. In some embodiments, the liquid crystal material may be deposited by, e.g., spin on coating. The liquid material may include polymerizable liquid crystal molecules, such as liquid crystalline acrylates. The liquid crystal layer 1215 may also include a chiral dopant. Preferably, the chiral dopant is mixed into the liquid crystal material before deposition on the patterned alignment layer 1210. After deposition, the liquid crystal molecules of the layer 1215 may be allowed to self-organize, which may form the various sublayers disclosed herein. In some embodiments, the self-organization may be facilitated by the application of heat energy. In some embodiments, the liquid crystal molecules of the layer 1215 may self-organize under naturally occurring forces over time (e.g., over a few hours or a few days). In some embodiments, the rate at which self-organization of the liquid crystal molecules of the layer 1215 occurs may be increased by application of energy, e.g., heat. It will be appreciated that the thickness of the layer 1215 and the identity and concentration of the chiral dopant may be selected to provide a particular twist angle for the liquid crystal molecules during self-organization.

Once the self-organization is complete, the orientations and positions of the liquid crystal molecules may be fixed, e.g., by polymerization of those molecules. In some embodiments, the polymerization is initiated by the application of UV light 1217 to the liquid crystal material 1215 as shown in FIG. 13D.

Figure 13D:
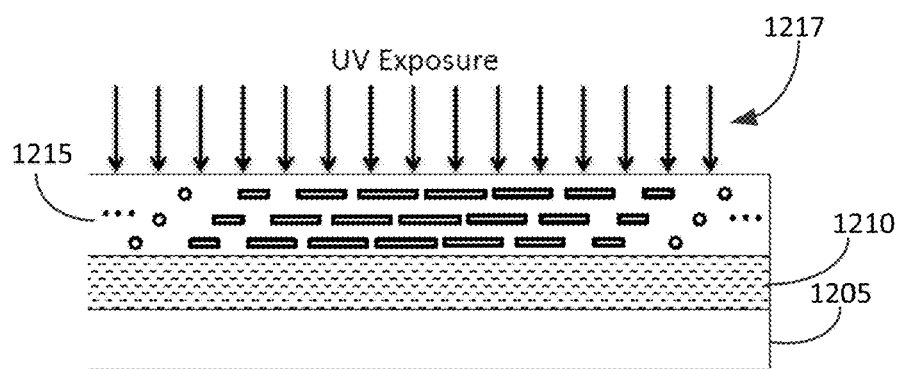

As shown in FIG. 1E, additional liquid crystal layers may then each be successively deposited, self-organized, and polymerized by repeating the processes of FIGS. 13C-13D. For example, the liquid crystal layer 1220 may be deposited directly on and in contact with the liquid crystal layer 1215, allowed to self-organize, and then polymerized. An additional liquid crystal layer 1222 may be deposited directly on and in contact with the liquid crystal layer 1220, allowed to self-organize, and then polymerized. This sequence may then be repeated for further liquid crystal layers. It will be appreciated that the thickness and chiral dopant concentration or composition may be different for each of the liquid crystal layers 1215, 1220, 1222 to provide different twist angles and different tilt angles, as discussed herein. It will be appreciated that, once polymerized, the liquid crystal layers 1215, 1220, 1222 may constitute liquid crystal gratings, such as the liquid crystal gratings 1110, 1120, 1130 discussed above.

Advantageously, each underlying liquid crystal layer may act as an alignment layer for an overlying liquid crystal layer in direct contact with that underlying layer. This can provide for a simplified fabrication process flow, and may also reduce Fresnel reflections at the interfaces between liquid crystal layers.

In some other embodiments, additional alignment layers may be disposed over one or more of the fixed liquid crystal layers prior to depositing additional liquid crystal layers. The additional alignment layers can be deposited and patterned as discussed above regarding FIGS. 13A and 13B. In some embodiments, these additional alignment layers may be patterned with the same pattern as the patterned alignment layer 1210. In some other embodiments, these additional alignment layers may have a different pattern than patterned alignment layer 1210, to provide different light steering properties for liquid crystal layers aligned to those additional alignment layers.

Figure 14:
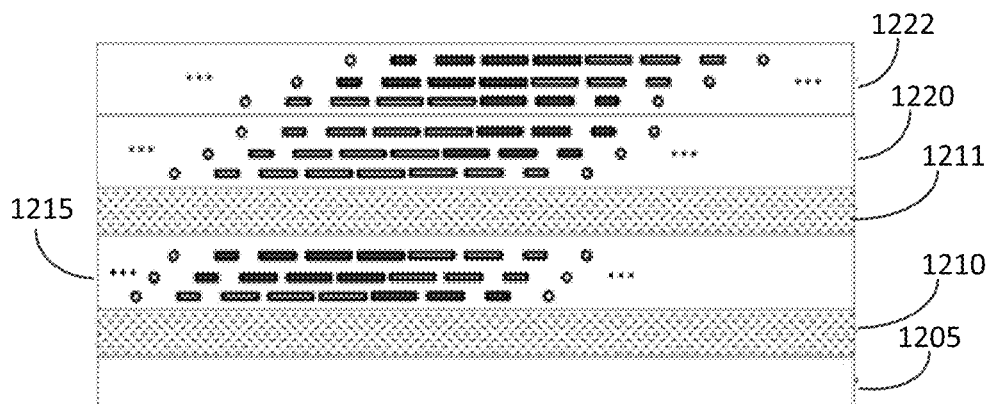
FIG. 14 illustrates a stack of grating structures having multiple alignment layers.

FIG. 14 illustrates a resulting stack of liquid crystal gratings structures 1215, 1220, 1222, having an additional patterned alignment layer 1211 between the liquid crystal gratings structures 1215 and 1220. In some other embodiments, additional alignment layers and liquid crystal layers are processed on a separate substrate and then transferred to another substrate through lamination.

Figure 15A:
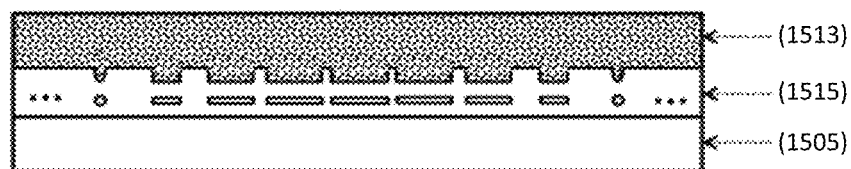
FIGS. 15A-15D illustrate examples of different structures formed during another process for making a stack of grating structures.

In some embodiments, an imprint template may be used to align liquid crystal molecules. The imprint template may subsequently be removed, thereby allowing the formation of a liquid crystal grating structure without an alignment layer. Advantageously, the imprint template can be used to align liquid crystals for more than one time, which can eliminate the patterning process for alignment layers for individual substrates. In some embodiments, the imprint template may be an intermediate imprint template, which is a replicated template from a master imprint template, which can be used to avoid potential damages or contamination of the master imprint template. FIGS. 15A-15D illustrate a method for manufacturing the various liquid crystal polarization grating structures described herein using an imprint template. The method comprises aligning liquid crystal molecules of a liquid crystal layer based upon the pattern of protrusions and valleys on the surface of an imprint template 1513. As noted above, the imprint template 1513 may be used in place of the alignment layer 1210 and may have a pattern similar to that which would be provided in the alignment layer 1210. As depicted in FIG. 15A, a layer 1515 of liquid crystal material is imprinted with the imprint template 1513. In some embodiments, the layer 1515 is first deposited on the substrate 1505 and the layer 1515 is subsequently contacted with the imprint template 1513 such that the pattern in the imprint template 1513 is imprinted into the layer 1515. In some other embodiments, the layer 1515 is deposited onto the input template 1513 and then joined with the substrate 1505. It will be appreciated that the layer of liquid crystal material can be deposited onto the substrate using various technologies including but not limited to jet-deposition or spin on deposition.

Figure 15B:
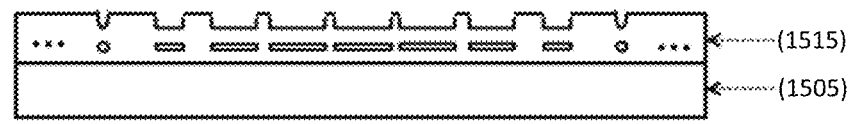

With continued reference to FIG. 15A, the molecules of the layer of liquid crystal material can align (e.g., self-align or self-organize) based on the surface features of the imprint template 1513 to result in a liquid crystal polarization grating having a desired grating structure. As discussed herein, the self-alignments may be facilitated by subjecting the liquid crystal material to an elevated temperature. The imprint template is subsequently separated from the liquid crystal layer 1515 after the molecules of the liquid crystal material have self-aligned and the liquid crystal material with the grating structures is polymerized (e.g., by exposure to UV light) as depicted in FIG. 15B. It will be appreciated that the removal of the imprint template may leave a pattern of depressions on the surface of the liquid crystal layer 1515. In some embodiments, the surface may be subjected to a planarization process (e.g., a chemical and/or mechanical planarization process) to form a planar surface. For example, a planarization layer 1525 can be disposed over the patterned liquid crystal layer 1515 as shown in FIG. 15D. The exposed surface (e.g., the surface opposite to the surface adjacent to the liquid crystal layer 1515) of the planarization layer 1525 can be planarized using a planarization template (e.g., a template having a substantially planar surface), by chemical mechanical polishing, by self-leveling, etc. In various embodiments, the planarization layer 1525 can comprise an oxide layer having a thickness between about 1 nm and about 100 nm. In various embodiments, the planarization layer 1525 can be configured to function as an isolation layer. Alternatively, the planarization layer 1525 may be omitted and the pattern of depressions on the surface of the liquid crystal layer 1515 may be retained.

Figure 15C:
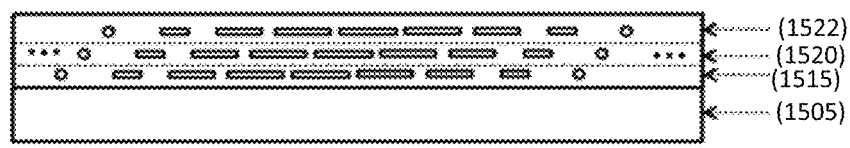
Figure 15D:
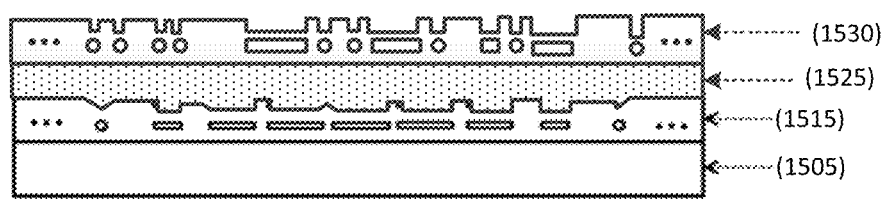

Additional liquid crystal layers can be sequentially deposited over the polymerized liquid crystal layer 1515 as shown in FIGS. 15C and 15D. As noted above, the surface of the liquid crystal layer 1515 onto which an additional layer is deposited may be planarized or may have retained a pattern of depressions form the imprint template. The pattern of depressions may subsequently be filled in with an optically transmissive filler (e.g., a planarization layer as discussed above) or may simply be retained and the additional liquid crystal layers may be deposited into and over the depressions. It will be appreciated that each underlying liquid crystal layer may serve as a template for self-alignment of an overlying liquid crystal layer 1520 or 1522, as disclosed herein and as depicted in FIG. 15C.

In some other embodiments, one or more of the additional liquid crystal layers can be imprinted with an imprint template and polymerized to obtain a desired alignment of the liquid crystal molecules in those one or more additional liquid crystal layers 1520, 1522 or 1530. For example, in the embodiment depicted in FIG. 15D, a second liquid crystal layer 1530 is disposed over the planarization layer 1525 and imprinted by a second imprint template. In such embodiments, the second liquid crystal layer 1530 can have a different orientation than would be obtained using the underlying liquid crystal layer has an alignment layer. For example, different imprint templates may be utilized to form a stack of liquid crystal gratings having different tilt angles, without using subsequent alignment layers. In some embodiments, a stack of liquid crystal grating structures 1515, 1520, 1522 may be formed with each layer directly in contact with neighboring layers and having different tilt angles.

It is contemplated that various embodiments may be implemented in or associated with a variety of applications such as imaging systems and devices, display systems and devices, spatial light modulators, liquid crystal based devices, polarizers, wave guide plates, etc. The structures, devices and methods described herein may particularly find use in displays such as wearable displays (e.g., head mounted displays) that can be used for augmented and/or virtually reality. More generally, the described embodiments may be implemented in any device, apparatus, or system that can be configured to display an image, whether in motion (such as video) or stationary (such as still images), and whether textual, graphical or pictorial. It is contemplated, however, that the described embodiments may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, head mounted displays and a variety of imaging systems. Thus, the teachings are not intended to be limited to the embodiments depicted solely in the Figures, but instead have wide applicability as will be readily apparent to one having ordinary skill in the art.

Various modifications to the embodiments described in this disclosure may be readily apparent to those skilled in the art, and the generic principles defined herein may be applied to other embodiments without departing from the spirit or scope of this disclosure. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. All such modifications are intended to be within the scope of claims associated with this disclosure.

The word "exemplary" is used exclusively herein to mean "serving as an example, instance, or illustration." Any embodiment described herein as "exemplary" is not necessarily to be construed as preferred or advantageous over other embodiments. Additionally, a person having ordinary skill in the art will readily appreciate, the terms "upper" and "lower", "above" and "below", etc., are sometimes used for ease of describing the figures, and indicate relative positions corresponding to the orientation of the figure on a properly oriented page, and may not reflect the orientation of the structures described herein, as those structures are implemented.

Certain features that are described in this specification in the context of separate embodiments also can be implemented in combination in a single embodiment. Conversely, various features that are described in the context of a single embodiment also can be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Additionally, other embodiments are within the scope of the following claims. In some cases, the actions recited in the claims can be performed in a different order and still achieve desirable results.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. An optical device comprising: a first polarization grating structure comprising:
    a first plurality of liquid crystal sublayers comprising liquid crystal molecules, wherein the liquid crystal molecules form repeating units having a first periodicity along a lateral axis, and
    wherein the repeating units are laterally shifted by a first shift distance in comparison to similar repeating units of an immediately adjacent one of the first plurality of sublayers, wherein the repeating units shifted by the first shift distance define a first tilt angle with respect to a normal to the lateral axis, the normal extending along a thickness axis of the first polarization grating structure; and a second polarization grating structure over the first polarization grating structure, the second polarization grating structure comprising:
    a second plurality of liquid crystal sublayers comprising liquid crystal molecules, wherein the liquid crystal molecules form repeating units having a second periodicity along the lateral axis, and
    wherein the repeating units are laterally shifted by a second shift distance in comparison to similar repeating units of an immediately adjacent one of the plurality of sublayers, wherein the repeating units shifted by the second shift distance define a second tilt angle with respect to the normal to the lateral axis, wherein magnitudes of the first and second tilt angles are different,
    wherein the first shift distance is larger than the second shift distance, and
    wherein the first plurality of liquid crystal sublayers are laterally shifted by a first aggregate shift larger than a second aggregate shift of the second plurality of liquid crystal sublayers.

2. The device of claim 1, wherein liquid crystal molecules in each of the plurality of sublayers of the first polarization grating structure are twisted by a first twist angle,
    wherein orientations of the liquid crystal molecules, as seen in a side or top-down view, vary in a repeating pattern laterally across each of the sublayers, and
    wherein each of the repeating units in the plurality of liquid crystal sublayers of the first polarization grating structure are formed by a plurality of liquid crystal molecules having a similar progression of orientations.

3. The device of claim 1, wherein the repeating units of successively higher levels of the liquid crystal sublayers of the first and second polarization grating structures are shifted in a same direction.

4. The device of claim 1, wherein liquid crystal molecules in each of the plurality of sublayers of the second polarization grating structure are twisted by a second twist angle,
  wherein orientations of the liquid crystal molecules, as seen in a side or top-down view, vary in a repeating pattern laterally across each of the sublayers,
  wherein each of the repeating units in the plurality of liquid crystal sublayers of the second polarization grating structure are formed by a plurality of liquid crystal molecules having a similar progression of orientations.

5. The device of claim 1, wherein the liquid crystal molecules in the plurality of sublayers are part of a polymerized liquid crystal material.

6. The device of claim 1, wherein the liquid crystal molecules in the plurality of sublayers comprise liquid crystalline di-acrylate.

7. The device of claim 1, wherein the plurality of sublayers are doped with chiral dopants.

8. The device of claim 1, wherein the liquid crystal molecules have a tilt angle ($\theta 1$) between about 85 degrees and 85 degrees.

9. The device of claim 8, wherein the liquid crystal molecules are configured to diffract at least 40% of a beam of light incident on the polarization grating structure at an incident angle ($\theta_{inc}$) between about −20 degrees and 20 degrees relative to the tilt angle.

10. The device of claim 1, further comprising a third polarization grating structure over the second polarization grating structure, the third polarization grating structure including a plurality of liquid crystal sublayers comprising liquid crystal molecules,
  wherein the liquid crystal molecules form repeating units having a third periodicity,
  wherein the repeating units are laterally shifted by a third shift distance in comparison to similar repeating units of an immediately adjacent one of the plurality of sublayers, wherein the repeating units shifted by the third shift distance define a third tilt angle with respect to the normal to the lateral axis,
  wherein magnitudes of the first, second, and third tilt angles are different.

11. The device of claim 10, wherein the liquid crystal sublayers of each of the first, second, and third polarization grating structures have different compositions than others of the first, second, and third polarization grating structures.

12. The device of claim 1, wherein the first and second polarization grating structures are over a waveguide and further comprising:
  a template layer over the waveguide and under the first and second polarization grating structures.

13. The device of claim 12, wherein the first and second polarization grating structures are in-coupling optical elements configured to in-couple an incident beam of light into the waveguide such that the incident beam of light propagates through the waveguide by total internal reflection.

14. The device of claim 13, further comprising a light modulation device configured to direct light into the waveguide via the first and second polarization grating structures.

15. The device of claim 13, wherein the first and second polarization grating structures are out-coupling optical elements configured to out-couple an incident beam of light propagating through the waveguide by total internal reflection.

16. The device of claim 13, wherein the first and second polarization grating structures are orthogonal pupil expanders configured to redirect light propagating through the waveguide by total internal reflection, wherein the redirected light continues to propagate through the waveguide by total internal reflection.

17. The device of claim 13, further comprising a stack of waveguides, each waveguide comprising first and second polarization grating structures comprising pluralities of liquid crystal sublayers having tilt angles of different magnitudes.

18. The device of claim 1, wherein a spacing along the thickness axis between adjacent sublayers of the first plurality of liquid crystal sublayers is larger than a spacing along the thickness axis between adjacent sublayers of the second plurality of liquid crystal sublayers.

* * * * *

UNITED STATES PATENT AND TRADEMARK OFFICE
CERTIFICATE OF CORRECTION

| | | |
|---|---|---|
| PATENT NO. | : 10,908,423 B2 | Page 1 of 2 |
| APPLICATION NO. | : 15/815250 | |
| DATED | : February 2, 2021 | |
| INVENTOR(S) | : Chulwoo Oh | |

It is certified that error appears in the above-identified patent and that said Letters Patent is hereby corrected as shown below:

On the Title Page

On page 3, in Column 2, item (56), Other Publications, Line 13, delete "archives" and insert --archive--.

On page 3, in Column 2, item (56), Other Publications, Line 24, delete "alighnment" and insert --alignment--.

On page 3, in Column 2, item (56), Other Publications, Line 27, delete "oflabel" and insert --of label--.

On page 4, in Column 1, item (56), Other Publications, Line 14, delete "retaration" and insert --retardation--.

On page 4, in Column 1, item (56), Other Publications, Line 25, delete "Cyrstalline" and insert --Crystalline--.

On page 4, in Column 2, item (56), Other Publications, Line 15, delete "polyner compostie:" and insert --polymer composite:--.

On page 4, in Column 2, item (56), Other Publications, Line 34, delete "PC7./" and insert --PCT/--.

In the Specification

In Column 14, Line 65, delete "systems." and insert --systems).--.

In Column 26, Line 62, delete "(FIG." and insert --(FIGS.--.

In Column 28, Line 2, delete "oley" and insert --oleyl--.

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*

In Column 32, Line 55, delete "Courmarine" and insert --Coumarin--.

Figure 13E:
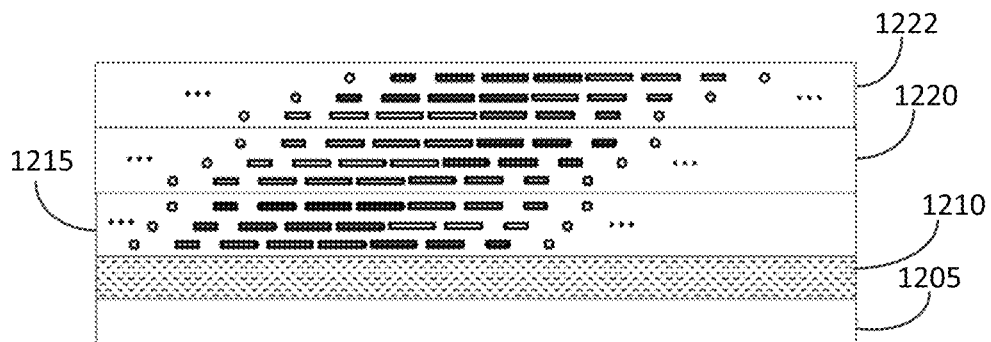

In Column 33, Line 54, delete "FIG. 1E," and insert --FIG. 13E,--.

In the Claims

In Column 39, Line 20, Claim 8, delete "85" and insert -- –85--.